(12) United States Patent
Sugama

(10) Patent No.: US 7,507,480 B2
(45) Date of Patent: Mar. 24, 2009

(54) CORROSION-RESISTANT METAL SURFACES

(75) Inventor: Toshifumi Sugama, Wading River, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 597 days.

(21) Appl. No.: 11/141,674

(22) Filed: May 31, 2005

(65) Prior Publication Data

US 2006/0269760 A1 Nov. 30, 2006

(51) Int. Cl.
*C08K 3/22* (2006.01)
(52) U.S. Cl. .................. 428/447; 524/780; 106/287.11; 427/387
(58) Field of Classification Search .................. 428/447; 106/287.11; 524/780; 427/387
See application file for complete search history.

(56) References Cited

U.S. PATENT DOCUMENTS

| | | | |
|---|---|---|---|
| 3,142,655 A | 7/1964 | Bobear | |
| 3,855,172 A | 12/1974 | Iler et al. | |
| 3,884,850 A | 5/1975 | Koda et al. | |
| 4,366,278 A | 12/1982 | Hamada et al. | |
| 4,637,889 A | 1/1987 | Kishimoto et al. | |
| 4,701,488 A | 10/1987 | Williams | |
| 4,749,550 A | 6/1988 | Goldie et al. | |
| 4,948,826 A | 8/1990 | Hirai | |
| 4,992,115 A | 2/1991 | Ikeda | |
| 5,008,317 A | 4/1991 | Wolfer et al. | |
| 5,035,745 A | 7/1991 | Lin et al. | |
| 5,099,006 A | 3/1992 | Gradeff et al. | |
| 5,175,202 A | 12/1992 | Kissel | |
| 5,198,487 A | 3/1993 | Kissel | |
| 5,204,384 A | 4/1993 | Matsushita et al. | |
| 5,231,156 A | 7/1993 | Lin | |
| 5,330,794 A | 7/1994 | Bosco et al. | |
| 5,344,712 A | 9/1994 | Basil et al. | |
| 5,384,357 A | 1/1995 | Levinson et al. | |
| 5,399,192 A | 3/1995 | Yamasoe | |
| 5,449,736 A | 9/1995 | Cabasso et al. | |
| 5,470,910 A | 11/1995 | Spanhel et al. | |
| 5,635,548 A | 6/1997 | Kittle et al. | |
| 5,698,483 A | 12/1997 | Ong et al. | |
| 5,718,907 A | 2/1998 | Labarre | |
| 5,750,610 A | 5/1998 | Burns et al. | |
| 5,777,001 A | 7/1998 | Seeney et al. | |
| 5,789,082 A | 8/1998 | Treadway | |
| 5,817,160 A | 10/1998 | Nagpal et al. | |
| 5,866,652 A | 2/1999 | Hager et al. | |
| 5,939,197 A * | 8/1999 | Blohowiak et al. | 428/413 |
| 5,939,487 A | 8/1999 | Kimura et al. | |
| 5,969,075 A | 10/1999 | Inoue | |
| 5,998,523 A | 12/1999 | Grunbauer et al. | |
| 6,180,248 B1 | 1/2001 | Basil et al. | |
| 6,228,904 B1 | 5/2001 | Yadav et al. | |
| 6,232,386 B1 | 5/2001 | Vargo et al. | |
| 6,239,205 B1 | 5/2001 | Hasegawa et al. | |
| 6,254,980 B1 | 7/2001 | Tadokoro et al. | |
| 6,297,302 B1 | 10/2001 | Heeks et al. | |
| 6,312,812 B1 | 11/2001 | Hauser et al. | |
| 6,469,119 B2 | 10/2002 | Basil et al. | |
| 6,551,482 B2 | 4/2003 | Yamamoto et al. | |
| 6,554,989 B2 | 4/2003 | Muramoto et al. | |
| 6,608,129 B1 | 8/2003 | Koloski et al. | |
| 6,686,406 B2 | 2/2004 | Tomomatsu et al. | |
| 6,716,895 B1 | 4/2004 | Terry | |
| 6,749,945 B2 | 6/2004 | Knobbe et al. | |
| 6,770,690 B2 | 8/2004 | Fujiki et al. | |
| 2001/0006731 A1 | 7/2001 | Basil et al. | |
| 2002/0121442 A1 | 9/2002 | Muramoto et al. | |
| 2002/0136911 A1 | 9/2002 | Yamamoto et al. | |
| 2003/0092812 A1 | 5/2003 | Nakada et al. | |
| 2004/0022950 A1 | 2/2004 | Jung et al. | |
| 2004/0116551 A1 | 6/2004 | Terry | |

FOREIGN PATENT DOCUMENTS

| AU | 32947/84 | 3/1985 |
|---|---|---|
| EP | 0 769 540 | 4/1997 |

OTHER PUBLICATIONS

M. Bethencourt, et al., "Lanthanide Compounds as Environmentally-Friendly Corrosion Inhibitors of Aluminum Alloys: A Review", *Corrossion Science*, vol. 40, No. 11, pp. 1803-1819 (1998).

T. Sugama et al, "Polyaminopropylsiloxane Coatings for Geothermal Air-cooled Condensers", *Recent Res. Devel. Mat. Sci.*, vol. 4, pp. 695-710 (2003).

M.A. Arenas et al., "Inhibition of 5083 Aluminium Alloy and Galvanised Steel by Lanthanide Salts", *Corrosion Science*, vol. 43, pp. 157-170 (2001).

Y. Xingwen et al., "Corrosion Behavior of Rare Earth Metal (REM) Conversion Coatings on Aluminum Alloy LY12", *Material Science and Engineering*, vol. A284, pp. 56-63 (2000).

S. Virtanen et al., "A Surface Analytical and Electrochemical Study on the Role of Cerium in the Chemical Surface Treatment of Stainless Steels", *Corrosion Science*, vol. 39, No. 10-11, pp. 1897-1913 (1997).

M. Forsyth et al., "ATR Characterization of Synergistic Corrosion Inhibition of Mild Steel Surfaces by Cerium Salicylate", *Corrosion Science*, vol. 44, pp. 2651-2656 (2002).

L.S. Kasten et al., "An XPS Study of Cerium Dopants In Sol-Gel Coatings For Aluminum 2024-T3", *Surface and Coatings Technology*, vol. 140, pp. 11-15 (2001).

(Continued)

*Primary Examiner*—Margaret G Moore
(74) *Attorney, Agent, or Firm*—Lori-Anne Neiger

(57) ABSTRACT

The present invention relates to metal surfaces having thereon an ultrathin (e.g., less than ten nanometer thickness) corrosion-resistant film, thereby rendering the metal surfaces corrosion-resistant. The corrosion-resistant film includes an at least partially crosslinked amido-functionalized silanol component in combination with rare-earth metal oxide nanoparticles. The invention also relates to methods for producing such corrosion-resistant films.

82 Claims, No Drawings

OTHER PUBLICATIONS

K. Aramaki, "The Inhibition Effects of Chromate-Free, Anion Inhibitors on Corrosion of Zinc in Aerated 0.5 M NaCl", *Corrosion Science*, vol. 43, pp. 591-604 (2001).

F. Mansfeld et al., "Development of "Stainless" Aluminum Alloys by Surface Modification," *Materials Science and Engineering*, vol. A198, pp. 51-61 (1995).

Y.C. Lu et al., "Chemical Treatment With Cerium to Improve the Crevice Corrosion Resistance of Austenitic Stainless Steels", *Corrosion Science*, vol. 37, No. 1, pp. 145-155 (1995).

A. Aballe et al., "CeCl₃ and LaCl₃ binary solutions as environment-friendly corrosion inhibitors of AA5083 Al-Mg alloy in NaCl solutions", *Journal of Alloys and Compounds*, vol. 323-324, pp. 855-858 (2001).

X. Yu, et al., "Corrosion Behavior of Rare Earth Metal (REM) Conversion Coatings on Aluminum Alloy LY12", *Materials Science & Engineering*, vol. A284, pp. 56-63 (2000).

D.R. Arnott et al., "Cationic-Film-Forming Inhibitors for the Protection of the AA 7075 Aluminum Alloy Against Corrosion in Aqueous Chloride Solution", *Corrosion Science*, vol. 45, No. 1, pp. 12-18 (1989).

S.M. Powell et al., "Use of the Scanning Reference Electrode Technique for the Evaluation of Environmentally Friendly, Nonchromate Corrosion Inhibitors", *Corrosion*, vol. 55, No. 11, pp. 1040-1051 (1999).

C.B. Breslin, "Influence of Rare-Earth Metal Passivation Treatments on the Dissolution of Tin-Zinc Coatings", *Corrosion*, vol. 54, No. 12, pp. 964-971 (1998).

B.R.W. Hinton, "The Corrosion Inhibition of Zinc with Cerous Chloride", *Corrosion Science*, vol. 29, No. 8, pp. 967-985 (1989).

B.R.W. Hinton et al., "The Inhibition of Aluminum Alloy Corrosion by Cerous Cations", *Metals Forum*, vol. 7, No. 4, pp. 211-217 (1984).

B.R.W. Hinton, "Corrosion Inhibition With Rare Earth Metal Salts", *Journal of Alloys and Compounds*, vol. 180, pp. 15-25 (1992).

A.J. Aldykewicz, Jr. et al., "The Investigation of Cerium as a Cathodic Inhibitor for Aluminum-Copper Alloys", *J. Electrochem. Soc.*, vol. 142, No. 10, pp. 3342-3350 (1995).

F. Mansfeld et al., "Corrosion Protection of High Copper Aluminium Alloys by Surface Modification", *British Corrosion Journal*, vol. 29, No. 3, pp. 194-200 (1994).

F. Mansfeld et al., "Development of Stainless Aluminum", *J. Electrochem. Soc.*, vol. 138, No. 12, pp. L74, L75 (1991).

Y.C. Lu et al., "The Improvement of the Localized Corrosion Resistance of Stainless Steel by Cerium", *Corrosion Science*, vol. 34, No. 11, pp. 1773-1785 (1993).

F. Mansfeld et al., "Short Communication—Pitting and Surface Modification of SIC/AL", *Corrosion Science*, vol. 27, No. 9, pp. 997-1000 (1987).

A.E. Hughes et al., "XPS and SEM Characterization of Hydrated Cerium Oxide Conversion Coatings", *Surface and Interface Analysis*, vol. 23, pp. 540-550 (1995).

F. Mansfeld, "Surface Modification and Stainless Steels: Green Technology for Corrosion Protection", *Surface and Coatings Technology*, vol. 90, pp. 224-228 (1997).

M.A. Arenas et al., "Cerium: A Suitable Green Corrosion Inhibitor for Tinplate", *Corrosion Science*, vol. 44, pp. 511-520 (2002).

X. Yu et al., "Electrochemical Study of the Corrosion Behavior Of Ce Sealing Of Anodized 2024 Aluminum Alloy", *Thin Solid Films*, vol. 423, pp. 252-256 (2003).

K. Aramaki, "Cerium (III) Chloride and Sodium Octylthiopropionate as an Effective Inhibitor Mixture for Zinc Corrosion in 0.5 M Nacl", *Corrosion Science*, vol. 44, pp. 1361-1374 (2002).

M. Balasubramanian et al., "An X-Ray Absorption Study of the Local Structure of Cerium in Electrochemically Deposited Thin Films", *Thin Solid Films*, vol. 347, pp. 178-183 (1999).

M. Dabala et al., "Cerium-Based Conversion Layers on Aluminum Alloys", *Applied Surface Science*, vol. 172, pp. 312-322 (2001).

W. G. Fahrenholz et al., "Characterization of Cerium-Based Conversion Coatings for Corrosion Protection of Aluminum Alloys", *Surface and Coatings Technology*, vol. 155, pp. 208-213 (2002).

\* cited by examiner

CORROSION-RESISTANT METAL SURFACES

This invention was made with Government support under contract number DE-AC02-98CH10886, awarded by the U.S. Department of Energy. The Government has certain rights in the invention.

The present invention relates to corrosion-resistant metal surfaces, and in particular, wherein a metal surface is rendered corrosion-resistant by application of a corrosion-resistant film. The invention also includes novel methods for producing such corrosion-resistant metal surfaces.

BACKGROUND OF THE INVENTION

As is well known, hexavalent chromium ($Cr^{+6}$) is one of the mostly widely used corrosion inhibitors for metal substrates. Hexavalent chromium has long provided outstanding corrosion resistance in combination with low cost.

However, hexavalent chromium is known to be extremely toxic to humans as well as polluting to the environment. Accordingly, there continues to be ongoing research to find corrosion-resistant coatings which are both chromium-free and economical.

For example, U.S. Patent Application No. US 2004/0022950 A1 to Jung et al. discloses coating metal substrates by applying a formulation which can include aminoalkyl-functionalized siloxanes in combination with metal oxide particles. Some of the metal oxide particles disclosed therein include, for example, cerium oxide and lanthanum oxide particles. The initially coated metal substrate is disclosed as being optionally thermally cured.

The coating in Jung et al. is disclosed as having a thickness of 0.01 µm to 10 µm, i.e., 10 nm to 10,000 nm thickness. Jung et al. also disclose a preferred coating thickness of 0.1 to 6 µm, and a most preferred thickness of 0.7 to 2 µm, i.e., 700 to 2,000 nm thickness. Accordingly, Jung et al. disclose covering a metal surface with a film preferably of micron range thickness.

However, in order to enhance the properties of metal surfaces selected for a particular purpose, there is still a need for ultrathin, for example, less than 10 nm thickness, chromium-free coatings which can impart corrosion resistance comparable to chromium. There also remains a need for a convenient and economical method for producing such ultrathin corrosion-resistant films.

SUMMARY OF THE INVENTION

In one aspect, the present invention relates to a corrosion-resistant metal surface. The corrosion-resistant metal surface includes a metal surface having thereon an ultrathin corrosion-resistant film. The ultrathin corrosion-resistant film includes an at least partially crosslinked amido-functionalized silanol component in combination with rare-earth metal oxide nanoparticles. The ultrathin coating preferably has a thickness of less than ten nanometers. The thickness of the ultrathin coating is more preferably approximately five nanometers or less.

In the ultrathin corrosion-resistant film, the rare-earth metal oxide nanoparticles include an oxide of one or more metal ions selected from the class of lanthanide metals, actinide metals, or a combination thereof. For example, the rare-earth metal oxide nanoparticles can include an oxide of one or more metal ions selected from lanthanum, cerium, praesodymium, neodymium, promethium, samarium, europium, gadolinium, terbium, dysprosium, holmium, erbium, thulium, ytterbium, or lutetium. In a preferred embodiment, the rare-earth metal oxide nanoparticles are nanoparticles of cerium oxide or samarium oxide.

In a preferred embodiment, the at least partially crosslinked amido-functionalized silanol component is composed, minimally, of at least partially crosslinked versions of one or more silanol compounds represented by the formula $R^1{}_n R^2{}_m R^3{}_r Si(OH)_{4-m-n-r}$ (1). In formula (1), $R^1$, $R^2$, and $R^3$ each independently represent H; or a saturated or unsaturated, straight-chained or branched, or cyclic, polycyclic, fused, or acyclic hydrocarbon group having 1 to 50 carbon atoms; wherein for at least one of the one or more silanol compounds, at least one of $R^1$, $R^2$, and $R^3$ represent hydrocarbon groups and at least one of the hydrocarbon groups has one or more hydrogen atoms substituted by one or more primary amino groups, one or more of which are N-acylated with one or more acyl groups; or alternatively, or in addition, one or more secondary carbon atoms substituted by one or more secondary amino groups, one or more of which are N-acylated with one or more acyl groups.

In formula (1), one or more hydrocarbon groups, either substituted or not substituted by one or more primary or secondary amino groups, optionally have one or more carbon atoms substituted by one or more additional heteroatom linkers or heteroatom groups; or alternatively, or in addition, have one or more hydrogen atoms substituted by one or more additional heteroatom groups. In addition, when two or all of $R^1$, $R^2$, and $R^3$ are present and two or all of $R^1$, $R^2$, and $R^3$ are hydrocarbon groups, two or three of the hydrocarbon groups can be optionally connected to form a silicon-containing ring or polycyclic ring system.

In formula (1), the subscripts m, n, and r independently represent 0 or 1; provided that m, n, and r are not all 0; and when m, n, and r are all 1, then at least one of $R^1$, $R^2$, and $R^3$ is additionally substituted with one or more groups selected from $=Si(OH)$, $=Si(OH)_2$, or $-Si(OH)_3$, wherein the symbols $=$ and $\equiv$ represent two and three separate single bonds, respectively, wherein each single bond is between a silicon atom and a carbon atom, or between a silicon atom and a suitable heteroatom. In a preferred embodiment, one or more additional heteroatom linkers or heteroatom groups are one or more silano linkers or silano groups.

More preferably, the one or more silanol compounds are silanetriol compounds independently represented by the formula $R^1 Si(OH)_3$ (2). In formula (2), $R^1$ independently represents a saturated or unsaturated, straight-chained or branched, or cyclic, polycyclic, fused, or acyclic hydrocarbon group having 1 to 50 carbon atoms, wherein for at least one of the silanetriol compounds, one or more hydrogen atoms of the hydrocarbon group are substituted by one or more primary amino groups, one or more of which are N-acylated with one or more acyl groups; or alternatively, or in addition, one or more secondary carbon atoms of the hydrocarbon group are substituted by one or more secondary amino groups, one or more of which are N-acylated with one or more acyl groups.

In a preferred embodiment, $R^1$ in formula (2) represents the formula $R^a-C(O)-NH-(CH_2)_p-$ (6). In formula (6), $R^a$ independently represents a saturated or unsaturated, straight-chained or branched, or cyclic, polycyclic, fused, or acyclic hydrocarbon group having 1 to 50 carbon atoms; and p represents an integer from 1 to 50. More preferably, p is an integer from 1 to 20, and $R^a$ independently represents a saturated or unsaturated, straight-chained or branched, cyclic or acyclic hydrocarbon group having 1 to 10 carbon atoms.

Preferably, the one or more acyl groups in the N-acylated primary amino groups or N-acylated secondary amino groups are independently represented by the formula $R^a-C(O)-$ (5). In formula (5), $R^a$ independently represents H; or a saturated or unsaturated, straight-chained or branched, or cyclic, polycyclic, fused, or acyclic hydrocarbon group having 1 to 50 carbon atoms. More preferably, $R^a$ is a methyl group.

Preferably, the at least partially crosslinked amido-functionalized silanol component includes at least partially crosslinked versions of N-acylated derivatives of one or more amino-functionalized silanetriols independently selected from aminomethylsilanetriol, 2-aminoethylsilanetriol, 3-aminopropylsilanetriol, 4-aminobutylsilanetriol, 5-aminopentylsilanetriol, 6-aminohexylsilanetriol, 7-aminoheptylsilanetriol, 8-aminooctylsilanetriol, 9-aminononylsilanetriol, 10-aminodecylsilanetriol, 11-aminoundecylsilanetriol, 12-aminododecylsilanetriol, 16-aminohexadecylsilanetriol, and 18-aminooctadecylsilanetriol.

In another embodiment, a portion of the silicon atoms in the at least partially crosslinked amido-functionalized silanol component are bound to carboxylate-containing groups. Preferably, the carboxylate-containing groups are independently represented by the formula $R^b$—C(O)O⁻ (7). In formula (7), $R^b$ independently represents H; or a saturated or unsaturated, straight-chained or branched, or cyclic, polycyclic, fused, or acyclic hydrocarbon group having 1 to 50 carbon atoms. More preferably, $R^b$ independently represents a saturated or unsaturated, straight-chained or branched, cyclic or acyclic hydrocarbon group having 1 to 12 carbon atoms. Even more preferably, the carboxylate-containing groups are acetate groups.

In a preferred embodiment, the corrosion-resistant metal surface includes a metal surface coated with an ultrathin corrosion-resistant film having a combination of an at least partially crosslinked N-acylated aminoalkylsilanetriol component and cerium oxide nanoparticles. The ultrathin corrosion-resistant film preferably has a thickness of less than ten nanometers.

In another preferred embodiment, a corrosion-resistant metal surface includes a metal surface coated with an ultrathin corrosion-resistant film having a combination of an at least partially crosslinked N-acylated aminoalkylsilanetriol component and samarium oxide nanoparticles. The ultrathin corrosion-resistant film has a thickness of less than ten nanometers.

The metal surface is preferably selected from the group consisting of aluminum, aluminum alloy, steel, iron, iron alloy, copper, copper alloy, lead, nickel, nickel alloy, zinc, zinc alloy, cobalt, cobalt alloy, chromium, and chromium alloy. Some particularly preferred classes of aluminum alloys include the classes of aluminum-copper and aluminum-magnesium alloys. Some particularly preferred copper alloys include bronze and brass. A particularly preferred class of iron alloy include the class of iron-copper alloys. The metal surface can also be passivated, and in particular, anodized.

Particularly relevant to the present invention is wherein the metal surface is a steel. The steel can be, for example, a low carbon steel, a medium carbon steel, a high carbon steel, a galvanized steel, a zinc phosphated steel, or a stainless steel.

In another aspect, the invention relates to a method for producing the corrosion-resistant metal surface described above. In a preferred embodiment, the method includes forming on a metal surface the ultrathin corrosion-resistant film described above, thereby rendering the metal surface corrosion-resistant.

More preferably, the ultrathin corrosion-resistant film is formed by subjecting a metal surface, having thereon one or more silanol compounds in combination with one or more rare-earth metal carboxylate compounds, to one or more treatment steps which promote or effect silanol crosslinking of the one or more silanol compounds and degradation of the one or more rare-earth metal carboxylate compounds to rare-earth metal oxide nanoparticles. At least one of the silanol compounds is amino-functionalized.

Even more preferably, the one or more treatment steps includes a thermal treatment step. The thermal treatment step includes thermally treating a metal surface, having thereon one or more silanol compounds in combination with one or more rare-earth metal carboxylate compounds, at a temperature and for a time sufficient to produce the corrosion-resistant metal surface. The thermal treatment step can be performed by any suitable method. Preferably, thermal treatment is performed in an oven.

In a preferred embodiment, the coated metal surface is heated to within a temperature range of approximately 40° C. to 250° C. for approximately 0.5 to 48 hours. More preferably, the metal surface is heated to within a temperature range of approximately 90° C. to 150° C. for approximately 1 to 24 hours. Even more preferably, the metal surface is heated to a temperature which requires approximately 2 to 6 hours of heating time.

Preferably, the combination described above is applied onto the metal surface as a solution. The solution contains a liquid phase, one or more silanol compounds described above, and one or more rare-earth metal carboxylate compounds. More preferably, the solution is an aqueous solution.

In one embodiment, the metal surface is dipped into the solution. In another embodiment, the solution is sprayed onto the metal surface.

The one or more rare-earth metal carboxylate compounds used in the method are preferably selected from the group of lanthanide metal carboxylates and/or actinide metal carboxylates. For example, in one embodiment, the one or more lanthanide metal carboxylates are composed of a carboxylate component and one or more metal ions selected from lanthanum, cerium, praesodymium, neodymium, promethium, samarium, europium, gadolinium, terbium, dysprosium, holmium, erbium, thulium, ytterbium, or lutetium. For example, the rare-earth metal carboxylate can be a cerium or samarium carboxylate, such as, for example, cerium acetate or samarium acetate.

The carboxylate component in the rare-earth metal carboxylate can be independently represented by the formula $R^b$—C(O)O⁻(7). In formula (7), $R^b$ independently represents a saturated or unsaturated, straight-chained or branched, or cyclic, polycyclic, fused, or acyclic hydrocarbon group having 1 to 50 carbon atoms. More preferably, $R^b$ independently represents a saturated or unsaturated, straight-chained or branched, cyclic or acyclic hydrocarbon group having 1 to 12 carbon atoms.

In another embodiment of the method, the one or more silanol compounds are derived by water-mediated hydrolysis of one or more siloxane compounds. The water-mediated hydrolysis can be aided by the inclusion of a catalytic amount of an acid or other chemical compound. The one or more siloxane compounds can be independently represented by the formula $R^1{}_nR^2{}_mR^3{}_rSi(OR^4)_{4-m-n-r}$ (3).

In formula (3), $R^1$, $R^2$, and $R^3$ each independently represent H; or a saturated or unsaturated, straight-chained or branched, or cyclic, polycyclic, fused, or acyclic hydrocarbon group having 1 to 50 carbon atoms; wherein for at least one of the one or more siloxane compounds, at least one of $R^1$, $R^2$, and $R^3$ represent a hydrocarbon group and at least one of the hydrocarbon groups has one or more hydrogen atoms substituted by one or more primary amino groups; or alternatively, or in addition, one or more secondary carbon atoms substituted by one or more secondary amino groups.

In formula (3), $R^4$ independently represents a saturated or unsaturated, straight-chained or branched, cyclic or acyclic hydrocarbon group having 1 to 6 carbon atoms. $R^4$ can also represent a silano group. Optionally, one or more hydrocarbon groups either substituted or not substituted by one or more primary or secondary amino groups, have one or more carbon atoms substituted by one or more additional heteroatom linkers or heteroatom groups; or alternatively, or in addition, have one or more hydrogen atoms substituted by one or more additional heteroatom groups. In addition, when two or all of $R^1$, $R^2$, and $R^3$ are present and two or all of $R^1$, $R^2$, and $R^3$ are hydrocarbon groups, two or three of the hydrocarbon groups are optionally connected to form a silicon-containing ring or polycyclic ring system.

The subscripts m, n, and r independently represent 0 or 1; provided that m, n, and r are not all 0; and when m, n, and r are all 1, then at least one of $R^1$, $R^2$, and $R^3$ is additionally substituted with one or more groups selected from $=$Si$(OR^d)$, $=$Si$(OR^d)_2$, or $-$Si$(OR^d)_3$, wherein $R^d$ independently represents H; or a saturated or unsaturated, straight-chained or branched, cyclic or acyclic hydrocarbon group having 1 to 6 carbon atoms, or a silano group; and the symbols $=$ and $\equiv$ represent two and three separate single bonds, respectively, wherein each single bond is between a silicon atom and a carbon atom or suitable heteroatom.

More preferably, the one or more siloxane compounds are independently represented by the formula $R^1Si(OR^4)_3$ (4). In formula (4), $R^1$ represents a saturated or unsaturated, straight-chained or branched, or cyclic, polycyclic, fused, or acyclic hydrocarbon group having 1 to 50 carbon atoms, wherein one or more hydrogen atoms of the hydrocarbon group are substituted by one or more primary amino groups; or alternatively, or in addition, one or more secondary carbon atoms of the hydrocarbon group are substituted by one or more secondary amino groups. $R^4$ is as described above.

In a preferred embodiment, $R^1$ in formula (4) represents the formula $H_2N-(CH_2)_p-$ (8). In formula (8), subscript p preferably represents an integer from 1 to 50. More preferably, p is an integer from 1 to 20.

For example, the one or more silanol compounds can be independently selected from aminomethylsilanetriol, 2-aminoethylsilanetriol, 3-aminopropylsilanetriol, 4-aminobutylsilanetriol, 5-aminopentylsilanetriol, 6-aminohexylsilanetriol, 7-aminoheptylsilanetriol, 8-aminooctylsilanetriol, 9-aminononylsilanetriol, 10-aminodecylsilanetriol, 11-aminoundecylsilanetriol, 12-aminododecylsilanetriol, 16-aminohexadecylsilanetriol, or 18-aminooctadecylsilanetriol.

In a particularly preferred embodiment, the method includes treating a metal surface wetted with an aqueous solution having a combination of one or more silanetriol compounds and one or more cerium carboxylate compounds at a temperature and for a time sufficient to produce the corrosion-resistant metal surface, wherein one or more of the silanetriol compounds are amino-functionalized. More preferably, one or more of the silanetriol compounds is 3-aminopropylsilanetriol and the cerium carboxylate compound is cerium acetate.

In another particularly preferred embodiment, the method includes treating a metal surface wetted with an aqueous solution having a combination of one or more silanetriol compounds and one or more samarium carboxylate compounds at a temperature and for a time sufficient to produce the corrosion-resistant metal surface, wherein one or more of the silanetriol compounds are amino-functionalized. More preferably, one or more of the silanetriol compounds is 3-aminopropylsilanetriol and the samarium carboxylate compound is samarium acetate.

In yet another aspect, the invention relates to the ultrathin corrosion-resistant film itself. The ultrathin corrosion-resistant film includes a combination of the at least partially crosslinked amido-functionalized silanol component and rare-earth metal oxide nanoparticles, as described above.

In summary, the present invention is based on the surprising discovery that an ultrathin coating having an at least partially crosslinked amido-functionalized silanol component combined with rare-earth metal oxide nanoparticles has outstanding corrosion resistance. In fact, the corrosion resistance of these coatings can be comparable, and even superior, to chromium-based coatings.

Furthermore, unlike chromium-based coatings, the coatings of the present invention provide excellent coverage of the substrate metal. This is particularly advantageous when the substrate to be coated possesses fine structural detail.

Additional advantages are provided by the novel and yet simple process of the invention for producing these ultrathin coatings. For example, since the method deposits a coating of ultrathin thickness, the method is highly economical. In addition, the method can provide for fast turnaround times, thus providing a high degree of efficiency.

DETAILED DESCRIPTION OF THE INVENTION

In one aspect, the invention relates to a corrosion-resistant metal surface. The metal surface is corrosion-resistant by having thereon an ultrathin corrosion-resistant film.

The term "metal surface" refers to a metallic surface of all, or a portion of, a metal-containing object. The metal objects can be of any shape. For example, the metal objects can be in the form of panels, bars, blocks, sheets, foils, rolls, tubes, cubes, ingots, wires, balls, pellets, beads, or mesh. The metal objects can also be in the shape of tools, dies, or electronic components. The metal objects can also be in the form of particles. For example, the metal objects can be particles of centimeter, millimeter, or micron dimension.

The metal surface can also be partially covered by a nonmetal component. For example, some portion of the metal surface can be covered by a polymer or a resist. The metal surface can be, for example, the surface of a printed circuit board which is partially covered or patterned with a photoresist. The metal surface having such a polymer or resist can also include a high degree of fine structural detail.

The metal surface can be composed of any metal or combination of metals for which corrosion protection is desired. Some examples of classes of metals suitable as a metal surface include the alkaline earth, transition, main group, lanthanide, and actinide classes of metals.

Some examples of alkaline earth metals suitable as a metal surface include beryllium (Be), magnesium (Mg), calcium (Ca), strontium (Sr), and barium (Ba). Some examples of suitable main group metals include boron (B), aluminum (Al), gallium (Ga), indium (In), silicon (Si), germanium (Ge), tin (Sn), and lead (Pb).

Some examples of transition metals suitable as a metal surface include the 3d transition metals (the row of transition metals starting with scandium (Sc)); the 4d transition metals (the row of transition metals starting with yttrium (Y)); and the 5d transition metals (the row of transition metals starting with hafnium (Hf)).

Some examples of 3d transition metals suitable as a metal surface include titanium (Ti), vanadium (V), chromium (Cr), manganese (Mn), iron (Fe), cobalt (Co), nickel (Ni), copper (Cu), and zinc (Zn). Some examples of suitable 4d transition metals include molybdenum (Mo), ruthenium (Ru), rhodium (Rh), palladium (Pd), silver (Ag), and cadmium (Cd). Some examples of suitable 5d transition metals include tantalum (Ta), tungsten (W), rhenium (Re), osmium (Os), iridium (Ir), platinum (Pt), and gold (Au).

Some examples of lanthanide metals suitable as a metal surface include lanthanum (La), cerium (Ce), neodymium (Nd), samarium (Sm), europium (Eu), gadolinium (Gd), and terbium (Tb). Some examples of actinide metals suitable as a metal surface include thorium (Th), protactinium (Pa), uranium (U), plutonium (Pu), and americium (Am).

In another embodiment, the metal surface is a metal alloy. Metal alloys include a combination of two or more metals. Accordingly, the metal alloy can be a binary, ternary, quaternary, or higher alloy. The metals in such a metal alloy can be a combination of, for example, one or more of the metals described above.

The metal alloys can also be homogeneous or heterogeneous in form. A homogeneous alloy contains two or more metals distributed uniformly on a molecular level, or within the grains of the metal alloy.

In a heterogeneous alloy, two or more metals are distributed non-uniformly in the metal alloy. For example, a heterogeneous alloy can be a composite of two or more metals. The composite can consist of particles of varying compositions of the metals on a nanometer, micrometer, millimeter, centimeter, or higher scale. Alternatively, the composite can include a structure having macroscopic layers of different metals bonded to each other.

Some examples of classes of metal alloys suitable as a metal surface include aluminum alloys, chromium alloys, iron alloys, cobalt alloys, nickel alloys, copper alloys, and zinc alloys. The alloys typically contain small amounts of other elements which are present either as impurities or to provide a functional purpose. Such trace elements can be present in amounts of, for example, 0.01 to 2.0 percent by weight. Some examples of such trace elements include chromium, iron, manganese, carbon, silicon, titanium, zinc, phosphorus, and sulfur.

Some examples of suitable metal alloys which include at least one metal selected from chromium, iron, nickel, copper, cobalt, or zinc include: iron-cobalt, iron-chromium, iron-nickel (e.g., the group of Invar® alloys), iron-copper, iron-zinc, iron-tungsten, iron-molybdenum, iron-titanium, iron-manganese, cobalt-nickel, cobalt-copper, cobalt-zinc, cobalt-chromium, cobalt-chromium-titanium, cobalt-iron-nickel, cobalt-iron-copper, cobalt-iron-zinc, cobalt-iron-chromium, nickel-copper, nickel-iron-copper (e.g., the Monel® alloys, nickel bronze), nickel-tungsten-copper, nickel-tungsten-iron, nickel-iron-titanium, nickel-iron-cobalt, nickel-manganese, nickel-copper-manganese, nickel-cobalt-copper, nickel-zinc, nickel-iron-zinc, nickel-cobalt-zinc, nickel-cobalt-iron-zinc, nickel-chromium (e.g., Nichrome®), nickel-iron-chromium (e.g., the group of Inconel® alloys), nickel-chromium-titanium, nickel-cobalt-chromium, nickel-cobalt-iron-chromium, nickel-iron-chromium-molybdenum (e.g., Incoloy 825®), nickel-iron-chromium-molybdenum-cobalt (e.g., Hastelloy C-4®), nickel-tungsten, nickel-molybdenum, nickel-molybdenum-iron (e.g., Hastelloy B-2®), copper-zinc (e.g., the brass alloys), copper-tin (e.g., the bronze alloys), copper-nickel-tin, copper-iron-zinc, copper-cobalt-zinc, copper-iron-cobalt, copper-nickel-iron-cobalt, copper-chromium, copper-iron-chromium, copper-chromium-iron-titanium, copper-cobalt-chromium, copper-tungsten, copper-manganese, zinc-nickel-copper, zinc-nickel-iron-copper, zinc-chromium, zinc-cobalt-chromium, zinc-cobalt-iron-chromium, zinc-nickel-chromium, zinc-nickel-iron-chromium, zinc-copper-chromium, titanium-chromium, vanadium-chromium-titanium, nickel-molybdenum-chromium-iron-tungsten, and nickel-molybdenum-chromium-iron-copper.

Some examples of suitable aluminum alloys include aluminum alloys of copper, magnesium, silicon, zinc, iron, chromium, manganese, and combinations thereof. For example, magnalium is an alloy of aluminum and about 5% magnesium. Other aluminum alloys include, for example, aluminum-nickel, aluminum-copper, aluminum-iron, aluminum-zinc, aluminum-cobalt, aluminum-chromium, nickel-aluminum-cobalt-iron (e.g., the group Alnico alloys), aluminum-chromium-titanium, aluminum-iron-copper, and iron-aluminum-chromium.

The weight percentage of aluminum in the aluminum alloys is not particularly limited. Some examples of suitable weight percentages of aluminum in aluminum alloys include 5%, 10%, 20%, 30%, 40%, 50%, 60%, 70%, 80%, 90%, 95%, 97%, 98%, and 99%.

Of particular consideration are the industrial classes of aluminum alloys. Some examples of industrial classes of aluminum alloys include the 1000, 2000, 3000, 4000, 5000, 6000, and 7000 series of aluminum alloy. Some specific examples of suitable aluminum alloys include those listed below:

Aluminum 2024-O (AA2024-O), Aluminum 2024-T3 (AA2024-T3), Aluminum 2024-T6 (AA2024-T6), all of which have a base composition of 90.7-94.7% Al; 3.8-4.9% Cu, 1.2-1.8% Mg, and Cr, Fe, Mn, Si, Ti, Zn in amounts less than 1%;

Aluminum 2025-T6 (AA2025-T6), which has a composition of 90.9-95.2% Al; 3.9-5% Cu, 0.4-1.2% Mn, 0.5-1.2% Si, and Cr, Fe, Mg, Ti, and Zn in amounts less than 1%;

Aluminum 2030 (AA2030), which has a composition of 88.8-95.2% Al; 3.3-4.5% Cu, 0.5-1.3% Mg, 0.8-1.5% Pb, and Bi, Cr, Fe, Mn, Si, Ti, and Zn in amounts less than 1%;

Aluminum 2219-T6 (AA2219-T6), which has a composition of 91.5-93.8% Al, 5.8-6.8% Cu, and Fe, Mg, Mn, Si, Ti, V, Zn, and Zr in amounts less than 1%;

Aluminum 2618A (AA2618A), which has a composition of 91.4-95.2% Al, 1.8-2.7% Cu, 0.9-1.4% Fe, 1.2-1.8% Mg, 0.8-1.4% Ni, and Mn, Si, Ti, Zn, Zr, and Ti in amounts less than 1%;

Alclad Aluminum 3004-H32, Alclad Aluminum 3004-H34, Alclad Aluminum 3004-H36, and Alclad Aluminum 3004-H38, which have a base composition of 95.5-98.2% Al, 0.8-1.3% Mg, 1-1.5% Mn, and Cu, Fe, Si, and Zn in amounts less than 1%;

Aluminum 3013 (AA3013), which has a composition of 94.7-98.4% Al, 0.9-1.4% Mn, and Cu, Fe, Mg, Si, and Zn in amounts less than 1%;

Aluminum 3103 (AA3103), which has a composition of 96.3% Al, 0.9-1.5% Mn, and Cr, Cu, Fe, Mg, Si, Zn, Zr, and Ti in amounts less than 1%;

Aluminum 6061 (AA6061A), which has a composition of 95.8%-98.6% Al, 0.8-1.2% Mg, and Cr, Cu, Fe, Mn, Pb, Si, Ti, and Zn in amounts less than 1%; and Aluminum 7075 (AA7075), which has a composition of 87.1-91.4% Al, 1.2-2% Cu, 2.1-2.9% Mg, 5.1-6.1% Zn, and Cr, Fe, Mn, Si, Ti in amounts less than 1%.

In a further embodiment, the metal surface includes one or more alkaline earth, transition, lanthanide, or actinide metals in combination with one or more main group elements. Some examples of main group elements include boron (B), aluminum (Al), gallium (Ga), indium (In), carbon (C), silicon (Si), germanium (Ge), tin (Sn), oxygen (O), sulfur (S), selenium (Se), tellurium (Te), nitrogen (N), phosphorus (P), and arsenic (As). For example, the metal surface can be in the form of a metal boride, metal aluminide, metal gallide, metal indide, metal carbide, metal silicide, metal germanide, metal stannide, metal oxide, metal sulfide, metal selenide, metal telluride, metal nitride, metal phosphide, metal arsenide, and combinations thereof.

In one embodiment, the metal surface is a metal oxide. Such metal oxide surfaces are often present on the surfaces of some passivated, and particularly, anodized metals. Some examples of classes of metal oxides suitable as metal surfaces include the class of silicon oxides, titanium oxides, vanadium oxides, chromium oxides, manganese oxides, iron oxides, cobalt oxides, nickel oxides, copper oxides, yttrium oxides, zirconium oxides, niobium oxides, molybdenum oxides, ruthenium oxides, tantalum oxides, tungsten oxides, rhenium oxides, gallium oxides, indium oxides, tin oxides, indium tin oxides, germanium oxides, thallium oxides, lithium oxides, magnesium oxides, calcium oxides, and aluminum oxides (e.g., the class of micas).

In another embodiment, the metal surface is a metal sulfide, a metal selenide, or a metal telluride. Some examples of classes of metal sulfides suitable as metal surfaces include the class of cadmium sulfides, gallium sulfides, iron sulfides, nickel sulfides, copper sulfides, lead sulfides, and zinc sulfides. Some examples of classes of metal selenides suitable as metal surfaces include the class of cadmium selenides, gallium selenides, copper selenides, and zinc selenides. Some examples of classes of metal tellurides suitable as metal surfaces include the class of cadmium tellurides, antimony tellurides, arsenic tellurides, bismuth tellurides, copper tellurides, europium tellurides, gallium tellurides, manganese tellurides, lead tellurides, and zinc tellurides.

In another embodiment, the metal surface is a metal nitride, metal phosphide, or metal arsenide. Some examples of classes of metal nitrides suitable as metal surfaces include the class of gallium nitrides, indium nitrides, aluminum nitrides, and boron nitrides. Some examples of classes of metal phosphides suitable as metal surfaces include the class of gallium phosphides, indium phosphides, and zinc phosphides. Some examples of classes of metal arsenides suitable as metal surfaces include the class of gallium arsenides, indium arsenides, and zinc arsenides.

In another embodiment, the metal surface is a metal boride. Some examples of classes of metal borides suitable as metal surfaces include the class of vanadium borides, barium borides, calcium borides, chromium borides, cobalt borides, hafnium borides, lanthanum borides, magnesium borides, molybdenum borides, nickel borides, tantalum borides, titanium borides, and zirconium borides.

In another embodiment, the metal surface is a metal carbide. Some examples of classes of metal carbides suitable as metal surfaces include the class of titanium carbides, vanadium carbides, chromium carbides, manganese carbides, iron carbides, cobalt carbides, nickel carbides, copper carbides, zinc carbides, niobium carbides, tantalum carbides, molybdenum carbides, tungsten carbides, silicon carbides, aluminum carbides, boron carbides, lithium carbides, barium carbides, calcium carbides, cerium carbides, and hafnium carbides.

Particularly relevant to the present invention are the steels, which are a subgroup of the class of iron carbides. Steels are alloys composed minimally of iron and carbon. Steels having a high carbon content, i.e., high carbon steels, possess great hardness, and are thus, useful for dies and cutting tools. Low- and medium-carbon steels are softer, and are thus, more amenable for sheeting and structural forms.

The steels typically contain one or more other elements to give them specific qualities. For example, aluminum steels are smooth and have a high tensile strength. Chromium steels and chromium-vanadium steels possess hardness, strength, and elasticity. Nickel steels have the properties of high-carbon steel but with less brittleness. Nickel-chromium steel possesses high shock resistance, and is thus, applicable to armor plate. Tungsten (i.e., wolfram) steels, molybdenum steels, and high-manganese steels are other specialized alloys. The stainless steels have a high chromium content and are known for their high tensile strength and abrasion- and corrosion-resistance. The galvanized steels are steels which have been treated to have a zinc surface. The zinc phosphated steels are steels which have been treated to have a zinc-phosphate surface.

Of particular consideration in the present invention are the industrial steels. Some examples of classes of industrial steels include the AISI 1000, AISI 4000, AISI 5000, AISI 6000, AISI 8000, AISI 9000, ASTM steel, T300 Series Stainless Steel, T400 Series Stainless Steel, T600 Series Stainless Steel, T S10000 Series Stainless Steel, T S20000 Series Stainless Steel, T S30000 Series Stainless Steel, and T S40000 Series Stainless Steel industrial classes of steels.

Some examples of industrial steels include the following, along with their percent weight compositions:

T302 (Fe 72%, C 0.15% max, Cr 17-19%, Mn 2% max, N 0.1% max, Ni 8-10%, P 0.045% max, S 0.03% max, Si 0.75% max)

T303 (Fe 69%, C 0.15% max, Cr 18%, Mn 2% max, Mo 0.6% max, Ni 9%, P 0.2% max, S 0.03% max, Si 0.75% max)

T304 (Fe 71%, C 0.08% max, Cr 18-20%, Mn 2% max, N 0.1% max, Ni 8-10.5%, P 0.045% max, S 0.03% max, Si 0.75% max)

T305 (Fe 69%, C 0.12% max, Cr 17-19%, Mn 2% max, Ni 10.5-13%, P 0.045% max, S 0.03% max, Si 0.75% max)

T308 (Fe 66%, C 0.08% max, Cr 20%, Mn 2% max, Ni 11%, P 0.045% max, S 0.03% max, Si 1% max)

T309S (Fe 59%, C 0.08% max, Cr 23%, Mn 2% max, Nb 0.8% min, Ni 14%, P 0.045% max, S 0.03% max, Si 1% max)

T317L (Fe 63%, C 0.03% max, Cr 18-20%, Mn 2% max, Mo 3-4%, N 0.1% max, Ni 11-15%, P 0.04% max, S 0.03% max, Si 0.75% max)

Carpenter Custom 455® Stainless Steel (Fe 75%, C 0.05% max, Cr 11-12.5%, Cu 1.5-2.5%, Mn 0.5% max, Mo 0.5% max, Nb 0.5% max, Nb+Ta 0.1-0.5%, Ni 7.5-9.5%, P 0.04% max, S 0.03% max, Si 0.5% max, Ta 0.5% max, Ti 0.8-1.4%)

T420 (Fe 86%, C 0.15-0.4%, Cr 12-14%, Mn 1% max, Ni 0.5%, P 0.04% max, S 0.03% max, Si 1% max)

AISI 1018, low carbon steel (Fe 98.81-99.26%, C 0.14-0.2%, Mn 0.6-0.9%, P 0.04% max, S 0.05% max)

AISI 1019, low carbon steel (Fe 98.71-99.16%, C 0.14-0.2%, Mn 0.7-1%, P 0.04% max, S 0.05% max)

AISI 1020, low carbon steel (Fe 99.08-99.53%, C 0.17-0.23%, Mn 0.3-0.6%, P 0.04% max, S 0.05% max)

AISI 1022 low carbon steel (Fe 98.68-99.13%, C 0.17-0.23%, Mn 0.7-1%, P 0.04% max, S 0.05% max)

AISI 1030 medium carbon steel (Fe 98.67-99.13%, C 0.27-0.34%, Mn 0.6-0.9%, P 0.04% max, S 0.05% max)

AISI 1045 medium carbon steel (Fe 98.51-99.98%, C 0.42-0.5%, Mn 0.6-0.9%, P 0.04% max, S 0.05% max)

AISI 1050 medium carbon steel (Fe 98.46-98.92%, C 0.47-0.55%, Mn 0.6-0.9%, P 0.04% max, S 0.05% max)

AISI 1060 high carbon steel (Fe 98.35-98.85%, C 0.55-0.66%, Mn 0.6-0.9%, P 0.04% max, S 0.05% max)

AISI 1065 high carbon steel (Fe 98.31-98.8%, C 0.6-0.7%, Mn 0.6-0.9%, P 0.04% max, S 0.05% max)

AISI 1080 high carbon steel (Fe 98.13-98.65%, C 0.75-0.88%, Mn 0.6-0.9%, P 0.04% max, S 0.05% max)

AISI 1132 medium carbon steel (Fe 97.84-98.3%, C 0.27-0.34%, Mn 1.35-1.65%, P 0.04% max, S 0.08-0.13)

AISI 4024 low carbon steel (Fe 98.12-98.72%, C 0.2-0.25%, Mn 0.7-0.9%, Mo 0.2-0.3%, P 0.035% max, S 0.035-0.05%, Si 0.15-0.35%)

AISI 4047 medium carbon steel (Fe 97.87-98.51%, C 0.45-0.5%, Mn 0.7-0.9%, Mo 0.2-0.3%, P 0.035% max, S 0.04% max, Si 0.15-0.35%)

AISI 5130 medium carbon steel (Fe 98%, C 0.28-0.33%, Cr 0.95%, Mn 0.8%, P 0.035% max, S 0.04% max, Si 0.23%)

AISI 6150 medium carbon steel (Fe 97%, C 0.48-0.53%, Cr 0.98%, Mn 0.8%, P 0.035% max, S 0.04% max, Si 0.23%, V 0.15% min)

In another embodiment, the metal surface is a metal silicide. Some examples of classes of metal silicides suitable as metal surfaces include the class of titanium silicides, vanadium silicides, chromium silicides, manganese silicides, iron silicides, cobalt silicides, nickel silicides, copper silicides, zirconium silicides, niobium silicides, molybdenum silicides, hafnium silicides, tantalum silicides, tungsten silicides, rhenium silicides, lanthanum silicides, cerium silicides, neodymium silicides, gadolinium silicides, ytterbium silicides, uranium silicides, boron silicides, beryllium silicides, magnesium silicides, calcium silicides, and aluminum silicides.

In another embodiment, the metal surface is a superconducting metal or metal alloy. For example, the metal surface can be in the class of copper oxide superconducting materials. Some examples of copper oxide superconducting materials include the yttrium barium copper oxide (Y—Ba—Cu—O) class of superconductors. Another example of a superconducting material is magnesium boride.

The corrosion-resistant metal surface described above has an ultrathin corrosion-resistant film thereon. For the purposes of this invention, the term "ultrathin" refers to a thickness of less than approximately ten nanometers, i.e., less than approximately one hundred Ångstroms (Å). More preferably, the film has a thickness of, or less than, approximately nine nanometers (9 nm); more preferably a thickness of, or less than, approximately eight nanometers (8 nm); more preferably a thickness of, or less than, approximately seven nanometers (7 nm); more preferably a thickness of, or less than, approximately six nanometers (6 nm); and even more preferably a thickness of, or less than, approximately five nanometers (5 nm).

The corrosion-resistant film has no particular minimum thickness. For example, the film can have a minimum thickness of approximately 0.1 nm (1 Å), 0.2 nm (2 Å), 0.3 nm (3 Å), 0.4 nm (4 Å), 0.5 (5 Å), 0.6 nm (6 Å), 0.7 nm (7 Å), 0.8 nm (8 Å), 0.9 nm (9 Å), 1.0 nm (10 Å), 1.5 nm (15 Å), 2.0 nm (20 Å), 2.5 nm (25 Å), 3.0 nm (30 Å), 3.5 nm (35 Å), 4.0 nm (40 Å), or 4.5 nm (45 Å).

Preferably, the film has a thickness in the range of approximately 1-9 nm. More preferably, the film has a thickness in the range of approximately 2-8 nm; more preferably in the range of approximately 2-6 nm; more preferably in the range of approximately 3-6 nm or 2-5 nm; and even more preferably in the range of approximately 3-5 nm.

The corrosion-resistant film includes an amido-functionalized silanol component which is at least partially crosslinked. The at least partially crosslinked amido-functionalized silanol component is herein also referred to as the amido-functionalized polysiloxane component.

The at least partially crosslinked amido-functionalized silanol component is composed, minimally, of one or more silanol compounds, at least a portion of which contain N-acylated amino groups, and which are at least partially crosslinked via Si—O—Si bonds. As used herein, the term "silanol compound" is any compound having one or more Si—(OH)$_t$ functionalities wherein t is 1, 2, or 3. Such silanol compounds include, for example, the monohydroxysilanes, dihydroxysilanes (silanediols), and trihydroxysilanes (silanetriols).

Depending on the conditions used, the crosslinking can be complete or partial. When every, or essentially every, crosslinkable silanol group is crosslinked, the silanol compounds can be said to be completely crosslinked. Complete crosslinking can also be referred to as, for example, 100% crosslinked or approximately 100% crosslinked. When a portion of the crosslinkable silanol groups in the silanol compounds are not engaged in crosslinking, the silanol compounds can be said to be partially crosslinked. Partial crosslinking can include, for example, 5%, 10%, 20%, 30%, 40%, 50%, 60%, 70%, 80%, 90%, 95%, 97%, 98%, and 99% crosslinking.

At least a portion of the one or more silanol compounds from which the amido-functionalized polysiloxane component is derived contain one or more amino groups (i.e., —NH$_2$ or —NH—), at least a portion of which are acylated, i.e., N-acylated with one or more acyl (—C(=O)—) groups. For example, the amido-functionalized polysiloxane component can include an at least partially crosslinked version of a single amino-functionalized silanol compound having one or more amino groups wherein one or more of the amino groups are bound to one or more acyl groups.

Alternatively, for example, the amido-functionalized polysiloxane component can include crosslinked versions of two or more amino-functionalized silanol compounds wherein the amino groups of one silanol compound is acylated while the amino groups of another one or more silanol compounds are not acylated. Still further, the amido-functionalized polysiloxane component can include crosslinked versions of one or more silanol compounds not bearing amino or amido groups in combination with one or more silanol compounds bearing amino groups, at least a portion of which are acylated. For primary amino groups (—NH$_2$), it is also possible for both hydrogens on the nitrogen to be substituted with acyl groups, thereby forming a urea linkage.

Preferably, the acyl group in the N-acylated amino groups are independently represented by the formula $$R^a\text{—C(O)—} \tag{5}$$

In formula (5), $R^a$ independently represents H; or any of the saturated or unsaturated, straight-chained or branched, cyclic, polycyclic, fused, or acyclic, substituted or unsubstituted hydrocarbon groups described above. Preferably, $R^a$ is any of the hydrocarbon groups described above and having 1 to 50 carbon atoms. More preferably, $R^a$ is any of the hydrocarbon groups described above and having 1 to 40 carbon atoms, more preferably 1 to 30 carbon atoms, more preferably 1 to 20 carbon atoms, more preferably 1 to 12 carbon atoms, more preferably 1 to 10 carbon atoms, more preferably 1 to 6 carbon atoms, more preferably 1 to 5 carbon atoms, and even more preferably 1 to 3 carbon atoms. In a particularly preferred embodiment, $R^a$ represents a methyl group.

Some examples of suitable acyl groups according to formula (5) include formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, icosanoyl, acryloyl, but-2-enoyl, but-3-enoyl, cyclohexanecarbonyl, cyclopentanecarbonyl, benzoyl, 4-methylbenzoyl, 4-isopropylbenzoyl, 4-t-butylbenzoyl, 3,5-dimethylbenzoyl, 3,5-diisopropylbenzoyl, 3,5-di-t-butylbenzoyl, phenylacetyl, biphenyl-4-carbonyl, naphthalene-2-carbonyl, and the like.

In a preferred embodiment, the one or more silanol compounds from which the at least partially crosslinked amido-functionalized polysiloxane component is derived, are represented by the formula:

$$R^1_n R^2_m R^3_r Si(OH)_{4-m-n-r} \quad (1)$$

In formula (1), $R^1$, $R^2$, and $R^3$ each independently represent H or a hydrocarbon group, provided that at least one of the silanol compounds in formula (1) have at least one of $R^1$, $R^2$, and $R^3$ represent a hydrocarbon group. In addition, at least one of the hydrocarbon groups has one or more hydrogen atoms substituted by one or more primary amino groups, one or more of which are N-acylated with one or more acyl groups. Alternatively, or in addition, at least one of the hydrocarbon groups has one or more secondary carbon atoms substituted by one or more secondary amino groups, one or more of which are N-acylated with one or more acyl groups. The subscripts m, n, and r independently represent 0 or 1, provided that m, n, and r are not all 0.

The maximum size of the hydrocarbon groups in $R^1$, $R^2$, and $R^3$ is not particularly limited. For example, the hydrocarbon groups can contain hundreds of carbon atoms. Or, for example, the hydrocarbon groups can contain up to two hundred, one hundred, fifty, forty, thirty, twenty-five, twenty, fifteen, ten, nine, eight, seven, six, or five carbon atoms.

There is no particular minimum size of the hydrocarbon groups in $R^1$, $R^2$, and $R^3$. For example, the hydrocarbon groups can contain a minimum of one, two, three, or four carbon atoms.

The size of the hydrocarbon groups in $R^1$, $R^2$, and $R^3$ are preferably within a size range of one to two hundred carbons atoms; more preferably within a size range of one to one hundred carbon atoms; more preferably in a size range of one to fifty carbon atoms; more preferably within a size range of one to twenty-five carbon atoms; more preferably within a size range of one to ten carbon atoms; more preferably within a size range of two to eight carbon atoms; and even more preferably within a size range of three to five carbon atoms.

In one embodiment, the hydrocarbon groups in $R^1$, $R^2$, and/or $R^3$ are completely acyclic in nature. The acyclic hydrocarbon groups can be saturated and straight-chained, i.e., straight-chained alkyl groups. Some examples of straight-chained alkyl groups include methyl, ethyl, propyl, n-butyl, pentyl, hexyl, octyl, nonyl, decyl, dodecyl, hexadecyl, eicosyl, docosyl, hexacosyl, triacontyl, tetracontyl, pentacontyl, and the like.

The acyclic hydrocarbon groups can also be saturated and branched, i.e., branched alkyl groups. Some examples of branched alkyl groups include iso-butyl, sec-butyl, t-butyl, iso-pentyl, neo-pentyl, di-(t-butyl)methyl, 3-ethyl-2,3-dimethylhexyl, and 4-(1,1-dimethylethyl)heptanyl.

The acyclic hydrocarbon groups can alternatively be unsaturated. Unsaturated hydrocarbon groups include, for example, alkenyl groups, alkynyl groups, and combinations thereof, i.e., enyne groups.

The unsaturated acyclic hydrocarbon groups can be straight-chained. Some examples of straight-chained alkenyl groups include vinyl, allyl, propenyl, 1-butenyl, 2-butenyl, 1-hexenyl, 1,3-hexadienyl, 1,3,5-hexatrienyl, octenyl, decenyl, hexadecenyl, and eicosenyl. Some examples of straight-chained alkynes include acetylenyl, 1-butynyl, 1-hexynyl, 1-octynyl, and 2,5-hexadiynyl. Some examples of straight-chained enyne groups include hex-1-en-3-ynyl and hexa-1,5-dien-3-ynyl.

The unsaturated acyclic hydrocarbon groups can alternatively be branched. Some examples of branched alkenyl groups include 2-methylene-3-butenyl, 2,3-dimethylbut-2-enyl, and 2,3-dimethyl-icos-1-enyl. Some examples of branched alkynyl groups include 2,5-dimethyl-hex-3-ynyl and 2,3-dimethyl-icos-1-ynyl.

In another embodiment, the hydrocarbon groups include one or more cyclic hydrocarbon moieties. Such hydrocarbon groups are cyclic hydrocarbon groups. The cyclic hydrocarbon moiety can be, for example, a four, five, six, seven, or eight member ring. The ring can be saturated or unsaturated. An unsaturated ring contains at least one double bond. For example, a five member ring can have one or two double bonds, and a seven member ring can have one to three double bonds.

In one embodiment, the ring is a carbocyclic ring. The carbocyclic ring can be saturated. Some examples of suitable saturated carbocyclic rings include cyclobutyl, cyclopentyl, cyclohexyl, cycloheptyl, and cyclooctanyl rings.

Alternatively, the carbocyclic ring can be unsaturated. The unsaturated carbocyclic rings can be either aromatic, i.e., "aryl" or "arenyl," or non-aromatic. Examples of unsaturated carbocyclic rings include cyclopentenyl, cyclohexenyl, cycloheptenyl, cyclopentadienyl, 1,3-cyclohexadienyl, 1,4-cyclohexadienyl, 1,3-cycloheptadienyl, cycloheptatrienyl, cyclooctadienyl, and phenyl rings.

The carbocyclic rings can also be polycyclic. Some examples of polycyclic carbocyclic ring systems include the bicyclo[2.2.2]octane and bicyclo[3.3.3]undecane polycyclic ring systems.

Any of the carbocyclic rings described above can also be fused to one or more, typically one or two, other carbocyclic rings to make a carbocyclic fused ring system. Some examples of completely saturated carbocyclic fused ring systems include decahydronaphthalenyl, tetradecahydroanthracenyl, tetradecahydrophenanthrenyl and hexadecahydropyrenyl fused ring systems. Some examples of unsaturated carbocyclic fused ring systems which are non-aromatic include bicyclo[4.3.0]non-3-enyl, bicyclo[4.4.0]dec-8-enyl, and bicyclo[4.4.0]dec-7,9-dienyl. Some examples of aromatic carbocyclic fused ring systems include naphthalenyl, phenanthrenyl, anthracenyl, triphenylenyl, azulenyl, chrysenyl, pyrenyl, and biphenylenyl.

The hydrocarbon groups described above for $R^1$, $R^2$, and/or $R^3$ of the silanol compounds of formula (1), whether substituted or not substituted with the N-acylated amino groups described above, can have other heteroatom linkers, heteroatom groups, or combinations thereof. For example, any of the hydrocarbon groups described above can optionally have one or more carbon atoms substituted by one or more heteroatom linkers or heteroatom groups. Alternatively, or in addition, any of the hydrocarbon groups can have one or more hydrogen atoms substituted by one or more heteroatom groups. When the hydrocarbon group is substituted by more than one heteroatom linker and/or group, the heteroatom linkers and/or groups can be the same or different.

Some examples of suitable additional heteroatom linkers include —O—, —S—, —S(O)—, —S(O)$_2$—, —C(O)—, —C(O)NH—, —C(O)O—, —NR$^c$—, =N—, —NR$^c$C(O)O—, —NR$^c$C(O)NR$^c$—, =N—NR$^c$—, and —C(O)—O—C(O)—. Some examples of heteroatom groups include halo, —OR$^c$, —SR$^c$, —N(R$^c$)$_2$, —N(R$^c$)$_3^+$, —NO$_2$, —C(O)N(R$^c$)$_2$, —(O)R$^c$, —C(O)O$^-$, —C(O)OR$^c$, —NR$^c$C(O)OR$^c$, —NR$^c$C(O)N(R$^c$)$_2$, —OCN, —NCO, —SCN, —NCS, —P(R$^c$)$_2$, —CN, —NC, —S(O)$_2$OH, —S(O)$_2$O$^-$, —PO$_3^{2-}$, and —C(O)—O—C(O)R$^c$. Some examples of halo groups include F, Cl, and Br.

In the heteroatom groups above, $R^c$ independently represents H, or any of the hydrocarbon groups described above. Preferably, $R^c$ represents any of the saturated or unsaturated, straight-chained or branched, cyclic or acyclic hydrocarbon group described above and having 1 to 6 carbon atoms.

Some examples of saturated acyclic groups suitable for $R^c$ include methyl, ethyl, n-propyl, isopropyl, n-butyl, sec-butyl, i-butyl, t-butyl, n-pentyl, n-hexyl, 4-methyl-2-pentyl, and so on. Some examples of unsaturated acyclic groups suitable for $R^c$ include vinyl, propenyl, isopropenyl, butenyl, propargyl, and so on.

Some examples of saturated cyclic groups suitable for $R^c$ include cyclopropyl, cyclobutyl, cyclopentyl, and cyclohexyl. Some examples of unsaturated cyclic groups suitable for $R^c$ include cyclobutenyl, cyclopentenyl, cyclohexenyl, and phenyl.

Of particular importance is the class of silano linkers and silano groups. Silano linkers are molecules which include one or more linking silicon atoms. The linking silicon atom can be attached to other atoms, such as oxygen (—O—), which also participate in the link. Some examples of silano linkers include —Si($R^c$)$_2$—, —Si($R^c$)=, —Si≡, —SiCl$_2$—, —SiCl=, —Si(O—)$_3$, —Si(O—)$_2$—, and —Si(O—)=. Silano groups, i.e., non-linking silano groups, are groups which include one or more silicon atoms and are not involved in a link. Some examples of such silano groups include —Si($R^c$)$_3$, —SiCl$_3$, —Si(O$R^c$)$_3$, —Si$R^c$(O$R^c$)$_2$, —Si($R^c$)$_2$(O$R^c$), —SiCl(O$R^c$)$_2$, and —Si(Cl)$_2$(O$R^c$).

As used above in the examples of silano linkers and silano groups, the symbol = represents two separate single bonds wherein each single bond is between a silicon atom and a carbon atom or between a silicon atom and a suitable heteroatom. Similarly, the symbol ≡ represents three separate single bonds wherein each single bond is between a silicon atom and a carbon atom or between a silicon atom and a suitable heteroatom.

In one embodiment, an acyclic hydrocarbon group of $R^1$, $R^2$, and/or $R^3$ in formula (1) is heteroatom-substituted with one or more —O— groups to form an alkyleneoxide or polyalkyleneoxide group. Some examples of polyalkyleneoxide groups include polymethyleneoxide, poly(methyleneoxide-ethyleneoxide), polyethyleneoxide, polypropyleneoxide, and poly(ethyleneoxide-propyleneoxide). Such polyalkyleneoxide groups can contain as low as two, three, or four alkyleneoxide units, or as high as hundreds or thousands of alkyleneoxide units.

When one or more ring carbon atoms of the carbocyclic rings described above for of $R^1$, $R^2$, and/or $R^3$ are substituted by one or more heteroatom linkers, a heterocyclic ring is formed.

Such a heterocyclic ring can be saturated. Examples of saturated heterocyclic rings containing one or more nitrogen heteroatoms include pyrrolidine, piperidine, imidazolidine, N,N'-dimethylimidazolidine, pyrazolidine, piperazine, homopiperazine, and hexahydro-1,3,5-triazine rings. Examples of saturated heterocyclic rings containing one or more oxygen heteroatoms include tetrahydrofuran, tetrahydropyran, and 1,4-dioxane rings. Examples of saturated heterocyclic rings containing one or more sulfur heteroatoms include tetrahydrothiophene and 1,4-dithiane rings. Examples of saturated heterocyclic rings containing a combination of heteroatoms include 1,3-oxazolidine, 1,3-thiazolidine, 1,3-oxathiolyl, and morpholine rings.

Alternatively, such a heterocyclic ring can be unsaturated. The unsaturated heterocyclic rings can be either aromatic, i.e., "heteroaryl" or "heteroarenyl," or non-aromatic. Examples of unsaturated heterocyclic rings containing one or more nitrogen heteroatoms include pyrrole, pyridine, pyrazole, pyrazine, pyrimidine, imidazole, and triazine rings. Examples of unsaturated heterocyclic rings containing one or more oxygen heteroatoms include furan, pyran, and 1,3-dioxole rings. Examples of unsaturated heterocyclic rings containing one or more sulfur heteroatoms include thiophenyl, thiopyran, 1,3-dithiole, and 1,3-dithiine rings. Examples of unsaturated heterocyclic rings containing a combination of heteroatoms include oxazole, thiazole, and oxathiole rings.

Any of the polycyclic carbocyclic rings described above can also be substituted to form polycyclic rings which are heteroatom-substituted. Some examples of such heteroatom-substituted polycyclic rings include 1,4-diazabicyclo[2.2.2]octane and 1,5-diaza-bicyclo[3.3.3]undecane polycyclic rings.

In addition, any of the heterocyclic rings or polycyclic heterocyclic rings described above can be fused to one or more, typically one or two, other rings to make a heterocyclic fused ring system.

In one embodiment, the heterocyclic fused ring system is composed of a mixture of carbocyclic and heterocyclic rings. Some examples of such fused ring systems include indoline, quinoline, isoquinoline, phthalazine, benzimidazole, benzothiazole, benzisoxazole, benzodioxole, quinoxaline, quinazoline, benzoxazine, cinnoline, acridine, and phenazine fused rings.

In another embodiment, the heterocyclic fused ring system is composed of only heterocyclic rings. Examples of such fused ring systems include pteridine, purine, 1,8-naphthyridine, 1,8,9-triazaanthracenyl, 1,5-diazabicyclo[4.3.0]non-5-ene and thieno[3,2-b]furan fused rings.

When two of $R^1$, $R^2$, and $R^3$ in formula (1) are present, i.e., when two of n, m, and p are 1, and two of $R^1$, $R^2$, and $R^3$ are hydrocarbon groups, the two hydrocarbon groups are optionally connected to form a silicon-containing ring. The new bond formed between atoms of the two hydrocarbon groups accompanies removal of a hydrogen atom from each carbon atom or heteroatom involved in forming the new bond.

The size of the silicon-containing ring resulting from interconnection of two of $R^1$, $R^2$, and $R^3$ in formula (1) is not particularly limited. However, preferably, the ring includes two to six ring carbon atoms. For example, in one embodiment, $R^1$ is a methyl group and $R^2$ is a methylamine group. The groups can be connected via carbon atoms to form a 2-aminosilacyclopropane ring. Alternatively, the groups can be connected via a carbon atom and a nitrogen atom to form a 3-azasilacyclobutane ring. In another embodiment, $R^1$ is an ethylamine group and $R^2$ is an isopropyl group. Depending on the atoms chosen for interconnection, the ethylamine and isopropyl groups can be connected to form, for example, a 1-amino-4-methylsilacyclobutane ring or a 1-methyl-3-azasilacyclopentane ring.

When all of $R^1$, $R^2$, and $R^3$ are present, i.e., when all of n, m, and p in formula (1) are 1; and all of $R^1$, $R^2$, and $R^3$ are hydrocarbon groups, the three hydrocarbon groups are optionally connected to form a silicon-containing polycyclic ring system. For example, in formula (1), $R^1$ can be 1-aminoethyl, $R^2$ can be ethyl, and $R^3$ 3-(silanetriol)propyl. $R^1$, $R^2$, and $R^3$ can be interconnected to form, for example, the polycyclic silanol compound 2-amino-1-sila-4-silanetriol-bicyclo[2.2.2]octan-1-ol.

For the purposes of the present invention, the silanol compounds according to formula (1) must allow for intermolecular crosslinking in order to produce at least partially crosslinked polysiloxane structures having silicon-oxide-silicon (Si—O—Si) bonds. Silanediol and silanetriol groups, for example, allow for such crosslinking due to the presence of more than one hydroxy group on each silicon atom. The silanediol and silanetriol compounds result when, for example, one or two of $R^1$, $R^2$, and $R^3$ in formula (1) are not present, i.e., when one or two of n, m, and r in formula (1) are 0.

However, the invention does not require that more than one hydroxy group be present on a silicon atom in the silanol compounds shown in formula (1). For example, m, n, and r in formula (1) can each be 1, thus providing only one hydroxy group on the silicon atom shown in formula (1). In such a case, the silanol compound is preferably substituted with one or more additional silanol groups. The presence of additional silanol groups allows for intermolecular crosslinking in the case where the silicon atom in formula (1) possesses only one hydroxy group.

Some examples of suitable additional silano groups are monohydroxy silicon atom groups, i.e., $\equiv$Si(OH), dihydroxy silicon atom groups, i.e., $=$Si(OH)$_2$, and trihydroxy silicon atom groups, i.e., —Si(OH)$_3$. For example, formula (1) can represent a molecule having two or more monohydroxy silicon atom groups. Alternatively, for example, formula (1) can represent a molecule having one or more monohydroxy silicon atom groups and one or more dihydroxy or trihydroxy silicon atom groups.

In a further embodiment to formula (1), one or more silanol compounds from which the at least partially crosslinked amido-functionalized silanol component is derived are one or more silanetriol compounds. The one or more silanetriol compounds are preferably independently represented by the formula:

$$R^1Si(OH)_3 \qquad (2)$$

In formula (2), $R^1$ independently represents any of the saturated or unsaturated, straight-chained or branched, cyclic, polycyclic, fused, or acyclic, substituted or unsubstituted hydrocarbon groups as described above for formula (1).

At least one of the silanetriol compounds according to formula (2) is substituted with one or more amino groups, one or more of which are N-acylated with one or more acyl groups. For example, when formula (2) represents a single silanetriol compound, the hydrocarbon group of $R^1$ has one or more hydrogen atoms substituted by one or more primary amino groups, one or more of which are N-acylated with one or more acyl groups; or alternatively, or in addition, one or more secondary carbon atoms substituted by one or more secondary amino groups, one or more of which are N-acylated with one or more acyl groups.

Alternatively, when formula (2) represents two or more silanetriol compounds, then the hydrocarbon group of $R^1$ for at least one of the silanetriol compounds has one or more hydrogen atoms substituted by one or more primary amino groups, one or more of which are N-acylated; or alternatively, or in addition, one or more secondary carbon atoms substituted by one or more secondary amino groups, one or more of which are N-acylated. Other combinations within the scope of the invention include, for example, two or more silanetriol compounds which differ structurally, but which are all substituted in some proportion by the one or more N-acylated amino groups described above.

In a more preferred embodiment of formula (2), $R^1$ represents the formula

$$R^a\text{—C(O)—NH—(CH}_2)_p\text{—} \qquad (6)$$

In formula (6), $R^a$ is as described for formula (5) above. Subscript p preferably represents an integer from 1 to 50, more preferably an integer from 1 to 40, more preferably an integer from 1 to 30, more preferably an integer from 1 to 20, more preferably an integer from 1 to 10, more preferably an integer from 1 to 5, and even more preferably an integer from 2 to 5.

Provided below for the purpose of illustration are some examples of silanol compounds according to formulas (1) and (2). Though the examples given below are of amino-containing silanol compounds, the examples are meant to include the N-acylated and crosslinked versions thereof, i.e., within the context of the at least partially crosslinked amido-functionalized silanol component discussed above. The examples of amino-containing silanol compounds are also suitable without modification as examples of precursors to the at least partially crosslinked amido-functionalized silanol component.

Some examples of suitable silanediol compounds according to formula (1) and having one primary amino group include (aminomethyl)-methylsilanediol, (aminomethyl)ethylsilanediol, (aminomethyl)-propylsilanediol, (aminomethyl)isopropylsilanediol, (aminomethyl)vinylsilanediol, (aminomethyl)allylsilanediol, (aminomethyl)propargylsilanediol, (aminomethyl)hexylsilanediol, (2-aminoethyl)-ethylsilanediol, (2-aminoethyl)(2-hydroxyethyl)silanediol, (1-aminoethyl)ethylsilanediol, (1-aminoethyl)propylsilanediol, (2-aminoethyl)vinylsilanediol, (2-aminoethyl)allylsilanediol, (3-aminopropyl)propylsilanediol, (3-aminopropyl)phenylsilanediol, (1-hydroxy-3-aminopropyl)benzylsilanediol, (3-aminopropyl)cyclohexylsilanediol, (3-aminopropyl)cyclopropylsilanediol, (1-aminoprop-2-yl)methylsilanediol, (2-aminoprop-2-yl)isopropylsilanediol, (2-aminopropyl)isobutylsilanediol, (2-aminopropyl)$_t$-butyl-silanediol, (1-aminopropyl)methylsilanediol, (3-amino-2-methylpropyl)methylsilanediol, (2-amino-1,1-dimethylethyl)ethylsilanediol, [2-(2-aminoethoxy)ethyl]methylsilanediol, {2-[2-(2-aminoethoxy)ethoxy]ethyl}methylsilanediol, (4-aminobutyl)butylsilanediol, (4-amino-2-buten-1-yl)ethylsilanediol, (5-aminopentyl)ethylsilanediol, (4-aminopentyl)propylsilanediol, (6-aminohexyl)methylsilanediol, (6-amino-3-hexen-1-yl)ethylsilanediol, (1-aminohexyl)-ethylsilanediol, (3-aminohexyl)ethylsilanediol, (7-aminoheptyl)methylsilanediol, (8-aminooctyl)-methylsilanediol, (8-aminooctyl)propylsilanediol, (7-aminooctyl)butylsilanediol, (9-aminononyl)methylsilanediol, (1-aminononyl)ethylsilanediol, (10-aminodecyl)ethylsilanediol, (4-aminodecyl)hexylsilanediol, (11-aminoundecyl)-propylsilanediol, (12-aminododecyl)-methylsilanediol, (11-aminododecyl)propylsilanediol, (16-aminohexadecyl)methylsilanediol, (1-aminohexadecyl)propylsilanediol, (12-aminohexadecyl)decylsilanediol, (18-aminooctadecyl)butylsilanediol, (20-aminoeicosyl)ethylsilanediol, (22-aminodocosyl)propylsilanediol, (30-aminotricosyl)butylsilanediol, (3-aminocyclopentyl)methylsilanediol, (2-amino-3-methylcyclopentyl)ethylsilanediol, (4-aminocyclohexyl)ethylsilanediol, (4-aminocyclohex-2-enyl)methylsilanediol, (o-aminophenyl)methylsilanediol, (p-aminophenyl)methylsilanediol, [3-(m-aminophenoxy)propyl]ethylsilanediol, (4-aminobenzyl)propylsilanediol, (4'-aminobiphenyl-4-yl)methylsilanediol, 3-amino-1-silacyclobutane-1,1-diol, 2-amino-1-silacyclopentane-1,1-diol, 4-amino-1-silacyclohexane-1,1-diol, and (bicyclo[2.2.1]hept-7-amino-2-yl)methylsilanediol.

Some examples of suitable silanediol compounds according to formula (1) and having more than one primary amino group include bis-(aminomethyl)silanediol, (aminomethyl)(2-aminoethyl)silanediol, (aminomethyl)(3-aminopropyl)silanediol, (aminomethyl)(6-aminohexyl)silanediol, bis-(2-aminoethyl)silanediol, (2-aminoethyl)(2-amino-1-hydroxyethyl)silanediol, (1-aminoethyl)(2-aminoethyl)

silanediol, (1-aminoethyl)(2-aminopropyl)silanediol, bis-(3-aminopropyl)silanediol, (1,3-diaminopropyl)ethylsilanediol, bis-(1,3-diaminopropyl)silanediol, (1,3-diaminopropyl)(2-aminoethyl)silanediol, (3-aminopropyl)(o-aminophenyl)silanediol, (1-hydroxy-3-aminopropyl)(4-aminobenzyl)silanediol, (3-aminopropyl)(2-aminocyclohexyl)silanediol, (3-aminopropyl)(2-aminocyclopropyl)silanediol, (1-aminoprop-2-yl)(aminomethyl)silanediol, bis-(2-aminoprop-2-yl)silanediol, bis-(1-aminopropyl)silanediol, bis-(3-amino-2-methylpropyl)silanediol, bis-(2-amino-1,1-dimethylethyl)silanediol, bis-[2-(2-aminoethoxy)ethyl]silanediol, bis-{2-[2-(2-aminoethoxy)ethoxy]ethyl}silanediol, bis-(4-aminobutyl)silanediol, (4-amino-2-buten-1-yl)(2-aminoethyl)silanediol, bis-(5-aminopentyl)silanediol, (4-aminopentyl)(3-aminopropyl)silanediol, (6-aminohexyl)(aminomethyl)silanediol, (6-amino-3-hexen-1-yl)(2-aminoethyl)silanediol, bis-(1-aminohexyl)silanediol, bis-(3-aminohexyl)silanediol, bis-(7-aminoheptyl)silanediol, bis-(8-aminooctyl)silanediol, (8-aminooctyl)(2-aminopropyl)silanediol, bis-(9-aminononyl)silanediol, bis-(1-aminononyl)silanediol, bis-(10-aminodecyl)silanediol, bis-(4-aminodecyl)silanediol, bis-(11-aminoundecyl)silanediol, bis-(12-aminododecyl)silanediol, (11-aminododecyl)(3-aminopropyl)silanediol, bis-(16-aminohexadecyl)silanediol, bis-(1-aminohexadecyl)silanediol, (12-aminohexadecyl)(6-aminodecyl)silanediol, bis-(18-aminooctadecyl)silanediol, bis-(20-aminoeicosyl)silanediol, bis-(22-aminodocosyl)silanediol, (30-aminotricosyl)(4-aminobutyl)silanediol, (3,4-diaminocyclopentyl)ethylsilanediol, (3,4-diamino-3-methylcyclopentyl)propylsilanediol, (3,5-diaminocyclohexyl),-butylsilanediol, (3,5-diaminocyclohexyl)(1,3,5-triaminopentyl)silanediol, (4-aminocyclohex-2-enyl)(aminomethyl)silanediol, bis-(o-aminophenyl)silanediol, bis-(p-aminophenyl)silanediol, bis-{[3-(m-aminophenoxy)propyl]ethyl}silanediol, bis-[(4-aminobenzyl)propyl]silanediol, bis-[(4'-aminobiphenyl-4-yl)methyl]silanediol, 2,4-diamino-1-silacyclobutane-1,1-diol, 2,5-diamino-1-silacyclopentane-1,1-diol, 3,4,5-triamino-1-silacyclohexane-1,1-diol, bicyclo[2.2.1]hept-5,6-diamino-2-yl)methylsilanediol, and (ureidopropyl)(2-aminoethyl)silanediol.

Some examples of suitable silanediol compounds according to formula (1) and having one or more secondary amino groups include (N-methyl-aminomethyl)methylsilanediol, (N-methyl-aminomethyl)propylsilanediol, (N-methyl-aminomethyl)vinylsilanediol, (N-methyl-aminomethyl)allylsilanediol, (N-methyl-aminomethyl)propargylsilanediol, (N-ethyl-aminomethyl)methylsilanediol, (N-propyl-aminomethyl)propylsilanediol, (N-butyl-aminomethyl)ethylsilanediol, (N-isopropyl-aminomethyl)ethylsilanediol, (N-butyl-aminomethyl)methylsilanediol, (N-isobutyl-aminomethyl)butylsilanediol, (N-pentyl-aminomethyl)ethylsilanediol, (N-hexyl-aminomethyl)ethylsilanediol, (N-cyclohexyl-aminomethyl)ethylsilanediol, (N-phenyl-aminomethyl)ethylsilanediol, (N-octyl-aminomethyl)ethylsilanediol, (N-decyl-aminomethyl)ethylsilanediol, (N-dodecyl-aminomethyl)methylsilanediol, (N-allyl-aminomethyl)propylsilanediol, [N-(3-butenyl)-aminomethyl]propylsilanediol, (N-methyl-2-aminoethyl)ethylsilanediol, (N-ethyl-2-aminoethyl)methylsilanediol, (N-propyl-2-aminoethyl)propylsilanediol, (N-butyl-2-aminoethyl)ethylsilanediol, (N-isopropyl-2-aminoethyl)ethylsilanediol, (N-butyl-2-aminoethyl)methylsilanediol, (N-isobutyl-2-aminoethyl)butylsilanediol, (N-pentyl-2-aminoethyl)ethylsilanediol, (N-hexyl-2-aminoethyl)ethylsilanediol, (N-octyl-2-aminoethyl)ethylsilanediol, (N-decyl-2-aminoethyl)ethylsilanediol, (N-dodecyl-2-aminoethyl)methylsilanediol, (N-methyl-2-aminoethyl)(2-hydroxyethyl)silanediol, (1-aminoethyl)(N-methyl-2-aminoethyl)silanediol, (N-methyl-2-aminoethyl)vinylsilanediol, (N-methyl-2-aminoethyl)allylsilanediol, (N-methyl-2-aminoethyl)cyclohexylsilanediol, (N-methyl-2-aminoethyl)phenylsilanediol, (N-methyl-3-aminopropyl)propylsilanediol, (N-isopropyl-3-aminopropyl)propylsilanediol, (N-ethyl-3-aminopropyl)phenylsilanediol, (N-isobutyl-3-aminopropyl)benzylsilanediol, (N-butyl-3-aminopropyl)cyclohexylsilanediol, (N-methyl-3-aminopropyl)cyclopropylsilanediol, (N-methyl-4-aminobutyl)methylsilanediol, (N-octyl-4-aminobutyl)methylsilanediol, (N-allyl-4-aminobutyl)ethylsilanediol, (N-methyl-8-aminooctyl)-methylsilanediol, (N-cyclopropyl-8-aminooctyl)methylsilanediol, (N-ethyl-9-aminononyl)methylsilanediol, (N-ethyl-10-aminodecyl)ethylsilanediol, (N-methyl-12-aminododecyl)methylsilanediol, (N-allyl-12-aminododecyl)methylsilanediol, (N-ethyl-12-aminohexadecyl)decylsilanediol, (pyrrolidin-3-yl)methylsilanediol, (2-methyl-pyrrolidin-3-yl)methylsilanediol, (piperidin-4-yl)methylsilanediol, (morpholin-2-yl)ethylsilanediol, (piperazin-1-yl)benzylsilanediol, (piperazin-2-yl)phenylsilanediol, (N-cyclohexylaminopropyl)methylsilanediol, 3-aza-1-silacyclobutane-1,1-diol, 2-aza-1-silacyclopentane-1,1-diol, and 4-aza-1-silacyclohexane-1,1-diol.

Some examples of suitable silanetriol compounds according to formula (2) and having one primary amino group include aminomethylsilanetriol, 2-aminoethylsilanetriol, 1-aminoethylsilanetriol, 3-aminopropylsilanetriol, 2-aminopropylsilanetriol, 1-aminopropylsilanetriol, 1-hydroxy-3-aminopropylsilanetriol, 1-aminoprop-2-ylsilanetriol, 2-aminoprop-2-ylsilanetriol, 3-amino-2-methylpropylsilanetriol, 2-amino-1,1-dimethylethylsilanetriol, 2-(2-aminoethoxy)ethylsilanetriol, 2-[2-(2-aminoethoxy)ethoxy]ethylsilanetriol, 4-aminobutylsilanetriol, 3-aminobutylsilanetriol, 4-amino-2-buten-1-ylsilanetriol, 5-aminopentylsilanetriol, 4-aminopentylsilanetriol, 3-aminopentylsilanetriol, 2-aminopentylsilanetriol, 1-aminopentylsilanetriol, 6-aminohexylsilanetriol, 6-amino-3-hexen-1-ylsilanetriol, 1-aminohexylsilanetriol, 3-aminohexylsilanetriol, 7-aminoheptylsilanetriol, 8-aminooctylsilanetriol, 7-aminooctylsilanetriol, 9-aminononylsilanetriol, 1-aminononylsilanetriol, 10-aminodecylsilanetriol, 4-aminodecylsilanetriol, 11-aminoundecylsilanetriol, 12-aminododecylsilanetriol, 11-aminodecylsilanetriol, 16-aminohexadecylsilanetriol, 1-aminohexadecylsilanetriol, 12-aminohexadecylsilanetriol, 18-aminooctadecylsilanetriol, 20-aminoeicosylsilanetriol, 22-aminodocosylsilanetriol, 30-aminotricosylsilanetriol, 3-aminocyclopentylsilanetriol, 2-amino-3-methylcyclopentylsilanetriol, 4-aminocyclohexylsilanetriol, 4-aminocyclohex-2-enylsilanetriol, o-aminophenylsilanetriol, p-aminophenylsilanetriol, 3-(m-aminophenoxy)-propylsilanetriol, 4-aminobenzylsilanetriol, (4'-aminobiphenyl-4-yl)silanetriol, and bicyclo[2.2.1]hept-7-amino-2-yl-silanetriol.

Some examples of suitable silanetriol compounds according to formula (2) and having more than one primary amino group include 1,2-diaminoethylsilanetriol, 1,1-diaminoethylsilanetriol, 1,3-diaminopropylsilanetriol, 1,2,3-triaminopropylsilanetriol, 3,5-diaminocyclohexylsilanetriol, 3,4-diaminophenylsilanetriol, 3,5-diaminophenylsilanetriol, 3,4,5-triaminophenylsilanetriol, 1,4-diaminobutylsilanetriol, 4,5-diaminopentylsilanetriol, 3,6-diaminohexylsilanetriol, 3,5-diaminohexylsilanetriol, 1,3,5-triaminohexylsilanetriol, 3,7-diaminoheptylsilanetriol, 1,8-diaminooctylsilanetriol, 4,8-diaminooctylsilanetriol, 7,9-diaminononylsilanetriol, 8,10-diaminodecylsilanetriol, 9,11-diaminoundecylsilanetriol, 10,12-diaminododecylsilanetriol, 14,16-diaminohexadecylsilanetriol, 4,10-diaminooctadecylsilanetriol, 3,4-diaminocyclopentylsilanetriol, 3,4-diamino-3-methylcyclopentylsilanetriol, 3,5-diaminocyclohexylsilanetriol, (ureidopropyl)(2-aminoethyl)silanetriol, and bicyclo[2.2.1]hept-5,6-diamino-2-yl-silanetriol.

Some examples of suitable silanetriol compounds according to formula (2) and having one or more secondary amino groups include N-methyl-aminomethylsilanetriol, N-methyl-aminomethylsilanetriol, N-methylaminomethyl-silanetriol, N-methyl-aminomethylsilanetriol, N-methyl-aminomethylsilanetriol, N-ethyl-aminomethylsilanetriol, N-propyl-aminomethylsilanetriol, N-butyl-aminomethylsilanetriol, N-isopropyl-aminomethylsilanetriol, N-butyl-aminomethylsilanetriol, N-isobutylaminomethyl-silanetriol, N-pentyl-aminomethylsilanetriol, N-hexyl-aminomethylsilanetriol, N-cyclohexyl-aminomethylsilanetriol, N-phenyl-aminomethylsilanetriol, N-octyl-aminomethylsilanetriol, N-decyl-aminomethylsilanetriol, N-dodecyl-aminomethylsilanetriol, N-allylaminomethyl-silanetriol, N-3-butenyl-aminomethylsilanetriol, N-methyl-2-aminoethylsilanetriol, N-ethyl-2-aminoethylsilanetriol, N-propyl-2-aminoethylsilanetriol, N-butyl-2-aminoethylsilanetriol, N-isopropyl-2-aminoethylsilanetriol, N-butyl-2-aminoethylsilanetriol, N-isobutyl-2-aminoethyl-silanetriol, N-pentyl-2-aminoethylsilanetriol, N-hexyl-2-aminoethylsilanetriol, N-octyl-2-aminoethylsilanetriol, N-decyl-2-aminoethylsilanetriol, N-dodecyl-2-aminoethylsilanetriol, N-methyl-3-aminopropylsilanetriol, N-isopropyl-3-aminopropylsilanetriol, N-ethyl-3-aminopropyl-silanetriol, N-isobutyl-3-aminopropylsilanetriol, N-butyl-3-aminopropylsilanetriol, N-methyl-3-aminopropylsilanetriol, N-methyl-4-aminobutylsilanetriol, N-octyl-4-aminobutylsilanetriol, N-allyl-4-aminobutylsilanetriol, N-methyl-8-aminooctylsilanetriol, N-cyclopropyl-8-aminooctyl-silanetriol, N-ethyl-9-aminononylsilanetriol, N-ethyl-10-aminodecylsilanetriol, N-methyl-12-aminododecylsilanetriol, N-allyl-12-aminododecylsilanetriol, N-ethyl-12-aminohexadecyl-silanetriol, pyrrolidin-3-ylsilanetriol, 2-methyl-pyrrolidin-3-ylsilanetriol, piperidin-4-ylsilanetriol, morpholin-2-ylsilanetriol, piperazin-1-ylsilanetriol, piperazin-2-ylsilanetriol, and N-cyclohexylaminopropylsilanetriol.

The silanol compounds according to formulas (1) and (2) also include silanol compounds having a multiple number of silano groups, i.e., multi-silano compounds.

One subclass of the multi-silano compounds is the class of linear polysiloxanes. Some subclasses of linear polysiloxanes include, for example, the disiloxanes, trisiloxanes, tetrasiloxanes, pentasiloxanes, hexasiloxanes, heptasiloxanes, and octasiloxanes. Some examples of suitable linear polysiloxanes according to formulas (1) or (2) include 1,3-bis[2-(aminoethyl)aminomethyl]-tetrahydroxydisiloxane, 1,5-bis-(aminomethyl)hexa-hydroxytrisiloxane, 1,7-bis-(aminomethyl)octahydroxytetrasiloxane, 1,9-bis-(aminomethyl)-decahydroxypentasiloxane, 1,15-bis-(aminomethyl)hexadecahydroxy-octasiloxane, 1,19-bis-(aminomethyl)eicosahydroxy-decasiloxane, 1,23-bis-(aminomethyl)tetracosahydroxy-dodecasiloxane, 3-aminopropylpentahydroxy-disiloxane, and 1,3-bis-(aminomethyl)-1,1,3,3-tetrakis(trihydroxysiloxy)disiloxane.

Another subclass of the multi-silano compounds is the class of cyclic polysiloxanes. Some subclasses of the cyclic polysiloxanes include, for example, the cyclotrisiloxanes, cyclotetrasiloxanes, cyclopentasiloxanes, and cyclohexasiloxanes. Some examples of suitable cyclic polysiloxanes include 2,2-bis-(aminomethyl)-4,4,6,6-tetrahydroxycyclotrisiloxane, 2,2-bis-(aminomethyl)-4,4,6,6,8,8-hexahydroxycyclotetrasiloxane, 2,2-bis-(aminomethyl)-4,4,6,6,8,8,10,10-octahydroxycyclopentasiloxane, and 2,2-bis-(aminomethyl)-4,4,6,6,8,8,10,10,12,12-decahydroxycyclohexasiloxane.

Another subclass of the multi-silano compounds is the class of polyhedral oligomeric silsesquioxanes, e.g., the commercially available POSS™ line of chemicals. Some examples of suitable silsesquioxane compounds bearing one or more primary or secondary amino groups include 1-(3-aminopropyl)-3,5,7,9,11,14-hexaisobutyltricyclo[7.3.3.1(5,11)]-heptasiloxane-endo-3,7,14-triol; 1-(3-aminopropyl)-3,5,7,9,11,14-hexaisooctyltricyclo-[7.3.3.1(5,11)]heptasiloxane-endo-3,7,14-triol; 1-[3-(2-aminoethyl)aminopropyl]-3,5,7,9,11,14-hexaisobutyltricyclo[7.3.3.1(5,11)]-heptasiloxane-endo-3,7,14-triol; and 1-[3-(2-aminoethyl)aminopropyl]-3,5,7,9,11,14-hexaisooctyltricyclo[7.3.3.1(5,11)]-heptasiloxane-endo-3,7,14-triol.

Other suitable multi-silanol compounds are those which are polymeric in nature. Some examples of polymeric silanol compounds include the class of silanol-terminated polydimethylsiloxanes, i.e., silanol-terminated silicones. The silanol-terminated polydimethylsiloxanes can also be amino-derivatized. The molecular weights of such polydimethylsiloxane polymers are not particularly limited. For example, the molecular weight of such polymers can be as low as 10,000, or as high as 500,000.

In a further embodiment, a portion of the silicon atoms in the at least partially crosslinked amido-functionalized silanol component are bound to carboxylate-containing groups through a silicon-oxygen bond of the type (—COO—Si). The carboxylate-containing groups include at least one carboxylate functionality. Accordingly, the carboxylate-containing groups include monocarboxylates, dicarboxylates, tricarboxylates, tetracarboxylates, and so on. Preferably, the carboxylate-containing groups contain a single carboxylate functionality and are represented by the formula $$R^b\text{—C(O)O—} \tag{7}$$

In formula (7), $R^b$ independently represents H; or any of the saturated or unsaturated, straight-chained or branched, cyclic, polycyclic, fused, or acyclic, substituted or unsubstituted hydrocarbon groups described above. Preferably, $R^b$ is any of the hydrocarbon groups described above and having 1 to 50 carbon atoms. More preferably, $R^b$ is any of the hydrocarbon groups described above and having 1 to 40 carbon atoms, more preferably 1 to 30 carbon atoms, more preferably 1 to 20 carbon atoms, more preferably 1 to 12 carbon atoms, more preferably 1 to 10 carbon atoms, more preferably 1 to 6 carbon atoms, more preferably 1 to 5 carbon atoms, and even more preferably 1 to 3 carbon atoms. In a particularly preferred embodiment, $R^b$ represents a methyl group and formula (7) accordingly represents an acetate group.

Some examples of suitable carboxylate-containing groups include formate, acetate, trifluoroacetate, propionate, butanoate, pentanoate, hexanoate, heptanoate, octanoate, nonanoate, decanoate, undecanoate, dodecanoate, tridecanoate, tetradecanoate, hexadecanoate, octadecanoate, icosanoate, acryloate, butenoate, cyclohexanecarboxylate, cyclohexylacetate, cyclopentanecarboxylate, benzoate, phenylacetate, 4-methylbenzoate, 4-isopropylbenzoate, 4-t-butylbenzoate, 3,5-dimethylbenzoate, 3,5-diisopropylbenzoate, 3,5-di-t-butylbenzoate, biphenyl-4-carboxylate, naphthalene-2-carboxylate, oxalate, malonate, succinate, glutarate (1,5-pentanedioate), 1,6-hexanedioate, fumarate, suberate, tartrate, 2-carboxymalonate, terephthalate, phthalate, 1,3,5-benzenetrioate, ethylenediaminetetraacetate, and diethylenetriaminepentaacetate.

The corrosion-resistant film includes the at least partially crosslinked amido-functionalized silanol component, as described above, in combination with rare-earth metal oxide nanoparticles. The rare-earth metal oxide nanoparticles are composed, minimally, of an oxide of one or more metal ions selected from the class of lanthanide metals, actinide metals, or a combination thereof.

In a preferred embodiment, the rare-earth metal oxide nanoparticles are lanthanide metal oxide nanoparticles. The lanthanide metal oxide nanoparticles are composed, minimally, of an oxide of one or more lanthanide metal ions. Some examples of suitable lanthanide ions include the ions of lanthanum (La), cerium (Ce), praesodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

For example, the lanthanide metal oxide nanoparticles can include an oxide of cerium, or an oxide of samarium. Alternatively, for example, the lanthanide metal oxide nanoparticles can include an oxide of a combination of cerium and samarium metal ions. Still further, for example, the lanthanide metal oxide nanoparticles can include an oxide of a combination of cerium, samarium, and one or more other lanthanide metal ions.

In another embodiment, the rare-earth metal oxide nanoparticles are actinide metal oxide nanoparticles. The actinide metal oxide nanoparticles are composed, minimally, of an oxide of one or more actinide metal ions. Some examples of suitable actinide metal ions include actinium (Ac), thorium (Th), protactinium (Pa), uranium (U), neptunium (Np), and americium (Am).

In yet another embodiment, the rare-earth metal oxide nanoparticles include a combination of one or more lanthanide metal ions and one or more actinide metal ions. For example, a rare-earth metal oxide nanoparticle can include an oxide of a combination of cerium and thorium, or samarium and thorium, or a combination of cerium, samarium, and thorium.

The oxidation state of the rare-earth metal ions can be any of the oxidation states typically encountered for such metals. For example, cerium oxide nanoparticles can contain cerium (III) ions, cerium(IV) ions, or a combination thereof. Samarium oxide nanoparticles can contain samarium(II) ions, samarium(III) ions, or a combination thereof. Europium oxide nanoparticles can contain europium(II) ions, europium (III) ions, or a combination thereof. Ytterbium oxide nanoparticles can contain ytterbium(II) ions, ytterbium(III) ions, or a combination thereof. Neptunium oxide nanoparticles can contain neptunium ions in an oxidation of +3, +4, +5, or +6. Many of the rare-earth metal ions, e.g., Gd, Tb, Dy, Ho, Er, Lu, are known to possess only the oxidation state of +3.

The rare-earth metal oxide nanoparticles can also include one or more additional elements or chemical species. For example, the rare-earth metal oxide nanoparticles can include one or more alkali, alkaline earth, main group, or transition metals. The rare-earth metal oxide nanoparticles can also include any suitable surface active agents on their surface. Some examples of surface active agents include metal-binding or metal-coordinating ligands, particle stabilizers, dispersants, templating species, and so on.

The size of the rare-earth metal oxide nanoparticles is not particularly limited, but is preferably less than about one hundred nanometers (nm) in any dimension. More preferably, the size of the nanoparticles is within the range of 1-50 nm, more preferably 1-20 nm, more preferably 1-10 nm, and even more preferably 1-5 nm. The oxide nanoparticles can be approximately, or precisely, monodisperse in size. Alternatively, the oxide nanoparticles can be anywhere from slightly to widely polydisperse in size.

The rare-earth metal oxide nanoparticles can also be of any shape. For example, the nanoparticles can be at least approximately spherical, oblong, rectangular, square planar, pyramidal, cuboidal, cylindrical, octahedral, cubooctahedral, icosahedral, rod-shaped, fibrous, or amorphous. The oxide nanoparticles can also be separate and distinct, or alternatively, agglomerated. In addition, the oxide nanoparticles can assume, in certain circumstances, a low, moderate, or high degree of organization with respect to each other in the corrosion-resistant film. For example, it is possible for the oxide nanoparticles to form ordered arrays in the corrosion-resistant film.

In another aspect, the invention relates to methods for producing the corrosion-resistant metal surface described above. The corrosion-resistant metal surface, as described above, can be produced by any suitable method.

In a preferred embodiment, the corrosion-resistant metal surface is produced by treating a metal surface having thereon a combination of one or more silanol compounds and one or more rare-earth metal carboxylate compounds. One or more of the silanol compounds are amino-functionalized.

The silanol compounds used in the method are precursors to the at least partially crosslinked amido-functionalized silanol component of the corrosion-resistant film. By practicing the method, the silanol compounds become at least partially crosslinked and at least a portion of the amino groups in the silanol compounds become N-acylated. Amidation and crosslinking of the silanol compounds cause the silanol compounds to be converted into the at least partially crosslinked amido-functionalized silanol component of the corrosion-resistant film.

In a preferred embodiment, at least one or more of the precursor silanol compounds used in the method are non-acylated amino-containing and uncrosslinked versions of the silanol compounds described by formula (1):

$$R^1{}_n R^2{}_m R^3{}_r \mathrm{Si(OH)}_{4-m-n-r} \quad (1)$$

For the precursor silanol compounds, $R^1$, $R^2$, and $R^3$ in formula (1) each independently represent H; or any of the saturated or unsaturated, straight-chained or branched, cyclic, polycyclic, fused, or acyclic, substituted or unsubstituted hydrocarbon groups described above under formula (1). At least one of the precursor silanol compounds according to formula (1) have at least one of $R^1$, $R^2$, and $R^3$ represent a hydrocarbon group. In addition, at least one of the hydrocarbon groups has one or more hydrogen atoms substituted by one or more primary amino groups; or alternatively, or in addition, at least one of the hydrocarbon groups has one or more secondary carbon atoms substituted by one or more secondary amino groups. The subscripts m, n, and r independently represent 0 or 1, provided that m, n, and r are not all 0.

In a further embodiment to formula (1), the method uses one or more precursor silanetriol compounds. The one or more precursor silanetriols are preferably independently represented by the formula:

$$R^1 \mathrm{Si(OH)}_3 \quad (2)$$

In formula (2), $R^1$ independently represents any of the saturated or unsaturated, straight-chained or branched, cyclic, polycyclic, fused, or acyclic, substituted or unsubstituted hydrocarbon groups as described above for formula (1). When formula (2) represents a single amino-functionalized precursor silanetriol compound, the hydrocarbon group of $R^1$ has one or more hydrogen atoms substituted by one or more primary amino groups; or alternatively, or in addition, one or more secondary carbon atoms substituted by one or more secondary amino groups.

When formula (2) represents two or more amino-functionalized precursor silanetriol compounds, then the hydrocarbon group of $R^1$ for at least one of the precursor silanetriol compounds has one or more hydrogen atoms substituted by one or more primary amino groups; or alternatively, or in addition, one or more secondary carbon atoms substituted by one or more secondary amino groups. For example, one or more precursor silanetriol compounds can be substituted by amino groups while one or more other precursor silanetriol compounds are not substituted by amino groups.

Other combinations within the scope of the invention include, for example, two or more amino-functionalized precursor silanetriol compounds which differ structurally, but which are all substituted in some proportion by one or more amino groups.

Examples of amino-functionalized silanediols and silanetriols suitable as precursors in the method have been given above. Examples of amino-functionalized precursor silanol compounds suitable for the method and containing more than one silano group have also been given above.

Particularly preferred for the method are amino-functionalized silanol compounds according to formula (2) wherein $R^1$ represents the formula:

$$H_2N—(CH_2)_p— \qquad (8)$$

In formula (8), p represents an integer from 1 to 50. The preferred embodiments of p are as described above for formula (6). Some particularly preferred amino-functionalized silanol compounds for use in the method include aminomethylsilanetriol, 2-aminoethylsilanetriol, 3-aminopropylsilanetriol, 4-aminobutylsilanetriol, 5-aminopentylsilanetriol, 6-aminohexylsilanetriol, 7-aminoheptylsilanetriol, 8-aminooctylsilanetriol, 9-aminononylsilanetriol, 10-aminodecylsilanetriol, 11-aminoundecylsilanetriol, 12-aminododecylsilanetriol, 16-aminohexadecylsilanetriol, and 18-aminooctadecylsilanetriol.

When the at least partially crosslinked amido-functionalized silanol component is derived from two or more silanol compounds according to formula (1), at least one of the silanol compounds is required to contain amino groups. At least a portion of the amino groups are converted to amido groups (N-acylated amino groups) by practicing the method. Accordingly, one or more of the silanol compounds can lack amino groups as long as one or more of the other silanol compounds contain amino groups.

In silanol compounds according to formula (1) not substituted with amino groups, $R^1$ and $R^2$ can be, for example, methyl groups, while $R^3$ is absent, or is H, or is any of the hydrocarbons described above not substituted with amino groups. The methyl groups of $R^1$ and $R^2$ can also optionally be interconnected to form a silacyclopropane ring. Alternatively, for example, $R^1$ and $R^2$ can be ethyl groups. The ethyl groups can be interconnected to form, for example, a silacyclopentane ring or a 2-methylsilacyclobutane ring. Still further, for example, $R^1$ can be a vinyl group and $R^2$ an ethyl group. Depending on the carbon linkage chosen for interconnection, the groups can be connected to form, for example, a 2-methylenesilacyclobutane ring or a silacyclopent-2-ene ring.

Another example of a silanol compound not substituted with amino groups and which is suitable for crosslinking with other amino-containing silanol compounds, is one containing a silicon-containing polycyclic ring system. In accordance with formula (1), when all of $R^1$, $R^2$, and $R^3$ are present, i.e., when all of n, m, and p in formula (1) are 1, and all of $R^1$, $R^2$, and $R^3$ are hydrocarbon groups, the three hydrocarbon groups are optionally connected to form a polycyclic ring system. For example, in formula (1), $R^1$ and $R^2$ can be ethyl groups while $R^3$ is a 3-(silanetriol)propyl group. $R^1$, $R^2$, and $R^3$ can be interconnected to form, for example, the polycyclic silanol compound 1-sila-4-silanetriol-bicyclo[2.2.2]octan-1-ol. For the purposes of the present invention, the foregoing polycyclic compound would need to be accompanied in the at least partially crosslinked amido-functionalized silanol component under formula (1) by one or more other silanol compounds bearing N-acylated amino groups.

Some other examples of silanol compounds which do not have amino groups, and which are suitable for combination with one or more silanol compounds having amino groups include $Si(OH)_4$ (orthosilicic acid), methylsilanetriol, trifluoromethylsilanetriol, ethylsilanetriol, vinylsilanetriol, propylsilanetriol, 3-bromopropylsilanetriol, 3-glycidoxypropylsilanetriol, isopropylsilanetriol, allylsilanetriol, 3-acryloxypropylsilanetriol, butylsilanetriol, isobutylsilanetriol, t-butylsilanetriol, t-butylmethylsilanetriol, pentylsilanetriol, hexylsilanetriol, octylsilanetriol, 10-undecenylsilanetriol, cyclohexylsilanetriol, phenylsilanetriol, pentafluorophenylsilanetriol, benzylsilanetriol, benzylmethylsilanediol, dimethylsilanediol, ethylmethylsilanediol, diethylsilanediol, dipropylsilanediol, ethylpropylsilanediol, methylpropylsilanediol, methylphenylsilanediol, ethylcyclohexylsilanediol, dibutylsilanediol, dipentylsilanediol, dihexylsilanediol, hexahydroxydisiloxane, octahydroxytrisiloxane, decahydroxytetrasiloxane, tetratricosahydroxyhexadecasiloxane, 1,3-dihydroxy-1,1,3,3-tetrakis(trihydroxysiloxy)disiloxane, hexahydroxycyclotrisiloxane, decahydroxycyclopentasiloxane, dodecahydroxycyclohexasiloxane, and adamantylethylsilanetriol.

Also included in the silanol compounds which do not have amino groups, but which are suitable for crosslinking with other amino-containing silanol compounds, are the crosslinkable silsesquioxane compounds. Some examples of such silsesquioxane compounds include 1,3,5,7,9,11,14-heptaisobutyltricyclo-[7.3.3.1(5,11)]heptasiloxane-endo-3,7,14-triol (isobutyltrisilanol-POSS™), and 1,3,5,7,9,11,14-heptaisooctyltricyclo[7.3.3.1(5,11)]heptasiloxane-endo-3,7,14-triol (isooctyltrisilanol-POSS™).

As is known in the art, silanol compounds can be derived by water-mediated hydrolysis from precursor reactive silanes. A highly reactive class of precursor silanes includes the corresponding chlorosilanes. A less reactive and more preferred class of precursor silanes includes the siloxanes, i.e., the alkoxysilanes.

For example, the one or more amino-functionalized silanol compounds described by formula (1) above can be derived by water-mediated hydrolysis of one or more amino-functionalized siloxane compounds independently represented by the formula:

$$R^1{}_n R^2{}_m R^3{}_r Si(OR^4)_{4-m-n-r} \qquad (3)$$

In formula (3), $R^1$, $R^2$, $R^3$, and $R^4$ each independently represent H or any of the saturated or unsaturated, straight-chained or branched, or cyclic, polycyclic, fused, or acyclic hydrocarbon groups, as described above under formula (1). Preferably, $R^4$ independently represents a saturated or unsaturated, straight-chained or branched, cyclic or acyclic hydrocarbon group having 1 to 6 carbon atoms, or a silano group.

In formula (3), the subscripts m, n, and r independently represent 0 or 1, provided that m, n, and r are not all 0. In addition, when m, n, and r are all 1, then at least one of $R^1$, $R^2$, and $R^3$ is additionally substituted with one or more groups selected from $\equiv Si(OR^d)$, $=Si(OR^d)_2$, or $—Si(OR^d)_3$. $R^d$ independently represents H, or any of the hydrocarbons described above. Preferably, $R^d$ represents a saturated or unsaturated, straight-chained or branched, cyclic or acyclic hydrocarbon group having 1 to 6 carbon atoms, or a silano group.

In a further embodiment of formula (3), one or more amino-functionalized silanol compounds are derived by water-mediated hydrolysis of one or more amino-functionalized trialkoxysilane compounds independently represented by the formula:

$$R^1Si(OR^4)_3 \tag{4}$$

In formula (4), $R^1$ and $R^4$ are as described above.

When siloxane precursors are used, water-mediated hydrolysis can be aided, where appropriate, by the inclusion of a catalytic amount of an acid. Some examples of suitable acids include, hydrochloric acid, sulfuric acid, nitric acid, and acetic acid.

The method produces a corrosion-resistant metal surface by first applying onto the metal surface a combination of one or more amino-functionalized silanol compounds, as described above, and one or more rare-earth metal carboxylate compounds. The rare-earth metal carboxylate compounds are composed, minimally, of a carboxylate component and one or more metal ions selected from the class of lanthanide metals, actinide metals, or a combination thereof.

The rare-earth metal carboxylate compounds of the method are precursors to the rare-earth metal oxide nanoparticles described above. Accordingly, the description provided above for rare-earth metal ions (in the rare-earth metal oxide nanoparticles) also describe the rare-earth metal ions in the rare-earth metal carboxylates.

For example, the rare-earth metal carboxylate can be a lanthanide metal carboxylate. The lanthanide metal carboxylate is composed, minimally, of a carboxylate component and one or more lanthanide metal ions, as described above. The lanthanide metal carboxylate can include, for example, one or more carboxylate salts of cerium, or one or more carboxylate salts of samarium. Alternatively, for example, the lanthanide metal carboxylate can include one or more carboxylate salts of a combination of cerium and samarium metal ions. Still further, for example, the lanthanide metal carboxylate can include one or more carboxylate salts of a combination of cerium, samarium, and one or more other lanthanide metal ions.

The rare-earth metal carboxylate can alternatively be an actinide metal carboxylate. The actinide metal carboxylates are composed, minimally, of a carboxylate salt of one or more actinide metal ions. For example, the actinide carboxylate salt can include a carboxylate salt of actinium, thorium, protactinium, uranium, neptunium, or americium.

In yet another embodiment, the rare-earth metal carboxylate includes a combination of one or more lanthanide metal ions and one or more actinide metal ions. For example, a rare-earth metal carboxylate can include one or more carboxylate salts of a combination of cerium and thorium, or samarium and thorium, or a combination of cerium, samarium, and thorium.

The carboxylate component of the rare-earth metal carboxylate includes one or more carboxylate-containing chemical groups. Accordingly, the carboxylate component includes monocarboxylates, dicarboxylates, tricarboxylates, tetracarboxylates, and so on. Preferably, the carboxylate component has a single carboxylate functionality.

More preferably, the carboxylate component of the rare-earth metal carboxylate is represented by formula (7) described above. The description for $R^b$ in formula (7), as well as all of the examples of carboxylate groups provided under formula (7), apply to the carboxylate component of the rare-earth metal carboxylates.

Some examples of lanthanide metal carboxylates include cerium formate, samarium formate, lanthanum acetate, cerium acetate, praesodymium acetate, neodymium acetate, samarium acetate, europium acetate, gadolinium acetate, terbium acetate, dysprosium acetate, holmium acetate, erbium acetate, thulium acetate, ytterbium acetate, lutetium acetate, cerium trifluoroacetate, gadolinium diethylenetriaminepentaacetate (gadopentetic acid), samarium propionate, cerium butanoate, europium pentanoate, cerium hexanoate, samarium hexanoate, praesodymium heptanoate, lanthanum octanoate, cerium nonanoate, samarium decanoate, cerium undecanoate, cerium dodecanoate, cerium benzoate, cerium oxalate, samarium oxalate, europium oxalate, lanthanum oxalate, cerium succinate, samarium glutarate (samarium 1,5-pentanedioate), cerium suberate, cerium ethylenediaminetetraacetate, and samarium ethylenediaminetetraacetate. Some examples of actinide metal carboxylates include thorium acetate and uranyl acetate.

The purity of the rare-earth metal carboxylates is not particularly limited. Preferably, the purity of the rare-earth metal carboxylates is 99% or higher. For example, the purity of the rare-earth metal carboxylates can be 99%, 99.9%, 99.99%, or 99.999%. In addition, the rare-earth metal carboxylates can be in the form of a hydrate or solvent adduct.

The one or more rare-earth metal carboxylate compounds can be used in the method directly, i.e., as pre-made rare-earth metal carboxylate compounds. Alternatively, the rare-earth metal carboxylate compound can be produced directly before practicing the method, or produced in situ during the method. The rare-earth metal carboxylate compound can be produced in situ by, for example, reacting a suitable rare-earth metal precursor compound with a carboxylate salt. Some examples of classes of suitable rare-earth metal precursor compounds include the rare-earth metal halides, nitrates, sulfates, and triflates. Some specific examples of such rare-earth metal precursor compounds include cerium chloride, samarium chloride, cerium nitrate, samarium nitrate, lanthanum sulfate, and erbium triflate.

Before treating the metal surface according to the methods of the invention, the metal surface typically undergoes a priming or pre-treatment process. The primary purpose of the pre-treatment process is to clean the metal surface. The metal surface can be treated by any of a variety of means as known in the art, including treatment with any of a variety of solutions containing detergents and other chemicals, at room temperature or elevated temperatures, either with or without the application of a voltage. The pre-treatment process can also serve to passivate the metal surface by using any of the anodization, galvanizing, and other passivating methods known in the art.

The combination of the one or more silanol compounds and the one or more rare-earth metal carboxylate compounds is in any suitable form on the metal surface. For example, the combination can be in the form of an adherent powder on the metal surface. Such an adherent powder can be applied by, for example, a powder coating process.

Preferably, the combination of one or more silanol compounds and one or more rare-earth carboxylate compounds is in a liquid phase, i.e., as a solution, on the metal surface. The metal surface can be wetted with such a solution by any suitable means.

For example, the metal surface can be dipped into a solution containing the one or more silanol compounds and one or more rare-earth carboxylate compounds. Alternatively, the metal surface can be dipped successively into two separate solutions wherein one solution contains the one or more silanol compounds and the other solution contains the one or more rare-earth carboxylate compounds.

The metal surface can alternatively be wetted by spraying the solution onto the metal surface. Spraying can be accomplished by using any suitable method, most preferably by the use of one or more spray guns. Other spraying technologies, such as indirect misting or fogging techniques, are also contemplated.

Spraying can be accomplished by spraying a solution containing a combination of the one or more silanol compounds and one or more rare-earth carboxylate compounds. Alternatively, the metal surface can be sprayed successively with two separate solutions wherein one solution contains the one or more silanol compounds and the other solution contains the one or more rare-earth carboxylate compounds.

When dipping or spraying are accomplished by using separate solutions, the subsequent dipping or spraying step must not, by necessity, completely remove the preceding deposited chemicals from the metal surface. For example, intermediate rinsing or conditioning steps can be used to, inter alia, prevent the removal of the preceding deposited chemicals and/or improve the deposition of the subsequent chemical. Additional steps before, between, or after successive dippings or spraying, such as drying steps or exposure to a radiative source, are also contemplated.

When a solution is used, preferably at least one of the silanol compounds or at least one of the rare-earth metal carboxylate compounds is at least partially soluble in the liquid phase of the solution. More preferably, at least one of the silanol compounds and at least one of the rare-earth metal carboxylate compounds are at least partially soluble in the liquid phase. Even more preferably, the one or more silanol compounds and the one or more rare-earth metal carboxylate compounds are all nearly, or completely, soluble in the liquid phase.

The liquid phase of the solution can be a single solvent. The solvent can be also be a solid or gas at room temperature and be converted to a liquid by modification of temperature and/or pressure. For example, the solvent can be solidified or partly solidified at room temperature and be converted to a suitable solvent by the application of heat. Alternatively, the solvent can be a gas at room temperature and be converted to a suitable solvent by cooling and/or application of increased pressure. An example of such a gas is carbon dioxide, which, upon cooling and/or an increase in pressure, liquefies into liquid (or supercritical) carbon dioxide.

The solvent of the solution is preferably a liquid at room temperature. Such a solvent can be, for example, a protic, polar aprotic, or hydrocarbon solvent. Some examples of suitable protic solvents include water, the class of alcohol solvents, and the classes of glycol and triol solvents. Some examples of suitable alcohol solvents include methanol, ethanol, propanol, isopropanol, butanol, isobutanol, t-butanol, 1-pentanol, and 1-hexanol. Some examples of glycol solvents include ethylene glycol, 1,2-propanediol, 1,3-propanediol, 1,2-butanediol, 1,4-butanediol, di(ethylene glycol), propylene glycol butyl ether, and tri(ethylene glycol). An example of a triol solvent is 1,2,4-butanetriol.

Some examples of polar aprotic solvents include acetonitrile, propionitrile, dimethylsulfoxide, N,N-dimethylformamide, N,N-diethylformamide, N,N-dimethylacetamide, methylene chloride, chloroform, diethyl ether, diisopropyl ether, diphenyl ether, propylene glycol dimethyl ether, propylene glycol dipropyl ether, tri(ethylene glycol)dimethyl ether.

Some examples of hydrocarbon solvents include the pentanes, hexanes, heptanes, octanes, benzene, toluene, and xylenes.

The liquid phase of the solution can be a combination of solvents, i.e., a solvent mixture. The combination of solvents can include two, three, or more solvents. The solvents can be miscible, partly miscible, or immiscible.

The solvent mixture can be aqueous-based or non-aqueous. The aqueous-based solvent contains water in any suitable amount. For example, an aqueous-based solvent can be composed solely of water, or the water can be present in a substantial proportion by weight or volume of the solvent mixture. Alternatively, the water can be in a trace amount in the solvent mixture. The non-aqueous solvent mixture contains two or more solvents in the absence of water. For example, the non-aqueous solvent mixture can contain a mixture of a high boiling ether solvent and a lower boiling hydrocarbon solvent.

The one or more silanol compounds can be in the solution in any desirable amount. For example, the one or more silanol compounds can be in a minimum amount of 0.01, 0.05, 0.1, 0.2, 0.3, 0.4, 0.5, 1.0, 2.0, 3.0, 4.0, 5.0, 6.0, 7.0, 8.0, or 9.0 percent by weight. The one or more silanol compounds can be in a maximum amount of, for example, 10, 15, 20, 25, 30, 35, 40, 45, 50, 60, 70, 80, 90, or 95 percent by weight. For example, in a preferred embodiment, the one or more silanol compounds are in an amount of approximately 0.1-10 percent by weight.

The one or more rare-earth metal carboxylate compounds can also be in the solution in any desirable amount. For example, the one or more rare-earth metal carboxylate compounds can be in a minimum amount of 0.001, 0.01, 0.05, 0.1, 0.2, 0.3, 0.4, 0.5, 0.6, 0.7, 0.8, 0.9, 1.0, 1.1, 1.2, or 1.3 percent by weight. The one or more rare-earth metal carboxylate compounds can be in a maximum amount of, for example, 1.5, 2.0, 2.5, 3.0, 3.5, 4.0, 4.5, 5.0, 10, 15, or 20 percent by weight. For example, in a preferred embodiment, the one or more rare-earth metal carboxylate compounds are in an amount of approximately 0.03-1.5 percent by weight.

The solution containing the one or more silanol compounds and the one or more rare-earth metal carboxylate compounds can include additional chemicals considered desirable or appropriate. For example, the solution can include additional carboxylate salt compounds. Some examples of classes of additional carboxylate salt compounds include carboxylates of the alkali, alkaline earth, main group, and transition metals. Some specific examples of additional carboxylate salt compounds include lithium acetate, lithium propionate, sodium acetate, sodium oxalate, sodium butanoate, sodium octanoate, sodium benzoate, potassium pentanoate, magnesium acetate, magnesium hexanoate, zinc acetate, iron acetate, tin acetate, zinc oxalate, tin oxalate, iron oxalate, copper acetate, nickel acetate, cobalt acetate, gallium acetate, lithium decanoate, sodium dodecanoate, potassium tartrate, and sodium salts of ethylenediaminetetraacetic acid.

The solution used in the method can also include metal oxide nanoparticles. Some examples of classes of metal oxide nanoparticles which can be included in the solution while practicing the method considered herein, include oxide nanoparticles of the alkali, alkaline earth, main group, transition, and rare-earth metals. Some examples of such metal oxide nanoparticles include all of the rare-earth metal oxide nanoparticles considered above which become incorporated in the corrosion-resistant film. Other metal oxide nanoparticles which can be included in the solution include, for example, nanoparticles of lithium oxide, sodium oxide, potassium oxide, beryllium oxide, magnesium oxide, calcium oxide, titanium oxide, yttrium oxide, zirconium oxide, vanadium oxide, tantalum oxide, copper oxide, and silicon oxide.

Nanoparticles of other compositions can also be included in the solution. For example, nanoparticles of zerovalent metals, metal sulfides, metal selenides, metal tellurides, metal nitrides, metal phosphides, metal arsenides, metal carbides, metal silicides, metal borides, metal aluminides, metal gallides, and so on, are all within the scope of the invention.

Other optional chemicals can be included in the solution containing the one or more silanol compounds and one or more rare-earth metal carboxylates. Some of these optional chemicals include detergents, wetting agents, anti-foaming agents, metal complexing agents, passivating agents, brightening agents, buffering agents, and the like.

The corrosion-resistant film is believed to be produced by several reactions. Some of the reactions include N-acylation of the amino groups in the silanol component (amidation); silano group cross-coupling (crosslinking); and degradation of the one or more rare-earth metal carboxylates to form the rare-earth metal oxide nanoparticles. The amidation reaction is believed to occur between the carboxylate portion of the one or more rare-earth metal carboxylate compounds and the amino group (or groups) in the amino-functionalized silanol compounds.

In addition, carboxylation of some portion of the silicon atoms of the silanol compounds can occur before, during, or after crosslinking by a reaction presumably between the carboxylate groups in the rare-earth metal carboxylate compounds and the silicon atoms in the silanol compounds.

In the method, the ultrathin corrosion-resistant film described above is formed on a metal surface. Preferably, the ultrathin corrosion-resistant film is formed by subjecting a metal surface having thereon a combination of the one or more silanol compounds and the one or more rare-earth metal carboxylates, i.e., the coated metal surface, to one or more treatment steps which promote or effect formation of the corrosion-resistant film on the metal surface. More particularly, the one or more treatment steps promote or effect silanol crosslinking and degradation of rare-earth metal carboxylate compounds to rare-earth metal oxide nanoparticles.

For example, the one or more treatment steps can include the application of heat, i.e., thermal treatment. Thermal treatment is applied according to the variables of temperature and time. Typically, the higher the temperature used, the lower the required amount of time required for thermal treatment. Aside from possible issues of damage to the metal surface, there is no particular upper limit for the applied temperature. The thermal treatment step can also serve additional purposes other than to promote formation of the corrosion-resistant film on the metal surface.

In one embodiment, the coated metal surface is thermally treated by maintaining the metal surface at approximately room temperature (20-30° C.) for an amount of time suitable for formation of the corrosion-resistant film. Such an amount of time can be, for example, hours, days, or even weeks. The coated metal surface can also be exposed to a moving air source during this time to facilitate drying.

In another embodiment, the coated metal surface is heated within a temperature range of approximately 40 to 250° C. Depending on the temperature selected in this range, the required time for thermal treatment can be, for example, 0.5 to 48 hours. More preferably, the coated metal surface is heated within a temperature range of 90 to 150° C. Depending on the temperature selected in this range, the required time for thermal treatment can be, for example, 1 to 24 hours. More preferably, the temperature is adjusted so that the required time for thermal treatment is within the range of approximately 2 to 6 hours.

In a preferred embodiment, the coated metal surface is thermally treated by heating in an enclosure, such as an oven. The coated metal surface can also be thermally treated by exposure to, for example, a heated air source or to infrared light.

Thermal treatment may not be suitable or preferred in certain circumstances. For example, the metal surface can contain thereon a patterned or unpatterned polymer or photoresist, either of which can be sensitive to heat. The metal surface can also be part of an electronic or semiconductor device, or contain such a device, wherein the device is heat sensitive. There may be other reasons for using treatment methods other than thermal treatment. These other treatment methods can be used instead of, or in combination with, thermal treatment methods.

Some examples of non-thermal treatment methods include chemical methods and exposure to a high energy source. Such non-thermal treatment methods can also be combined, if desired.

Chemical treatment methods use one or more chemicals which promote or effect crosslinking of silanol compounds and/or degradation of rare-earth metal carboxylates to rare-earth metal oxide nanoparticles. For example, crosslinking can be aided by inclusion of an appropriate metal salt. Some examples of appropriate metal salts include titanates and the carboxylic acid salts of zinc, iron, and tin.

High energy sources suitable for treating the coated metal surface can be classified as radiative or non-radiative. Some examples of radiative energy sources include microwaves, ultraviolet light, x-rays, and gamma rays. Other radiative energy sources can be in the form of particle bombardment, such as used in electron or neutron bombardment. An example of a non-radiative energy source is ultrasound, and particularly high frequency ultrasound.

The method described above can be practiced in any suitable environment. For example, the method can be practiced under typical humidity, pressure, and air composition. Alternatively, the method can be practiced by using, for example, a low humidity or high humidity environment, or a reduced pressure or increased pressure environment, or a reduced oxygen, oxygen-free, or increased oxygen environment.

Examples have been set forth below for the purpose of illustration and to describe the best mode of the invention at the present time. However, the scope of this invention is not to be in any way limited by the examples set forth herein.

EXAMPLES

Example 1

Preparation of Corrosion-Resistant Metal Surfaces

A soaking bath of the following composition was prepared by mixing all of the following ingredients with a magnetic stirrer at room temperature: 0.1-10.0 weight percent (wt %) of 3-aminopropylsilanetriol, 0.03-1.5 wt % of cerium (III) acetate hydrate, and 99.9-88.5 wt % water. The ingredients were mixed until the powdery cerium acetate hydrate compound was completely dissolved.

Steel and aluminum substrates were coated in the following manner. First, to remove any surface contaminants, the substrates were immersed for 20 minutes at 80° C. in an alkaline solution consisting of 0.4 wt % sodium hydroxide, 2.8 wt % tetrasodium pyrophosphate, 2.8 wt % sodium bicarbonate, and 94.0 wt % water. The alkali-cleaned substrates were washed with deionized water at 25° C. for approximately 1 minute, and then dried for approximately 15 minutes at 100° C. The metal substrates were then dipped into the above soaking bath at room temperature and withdrawn slowly. Alternatively, the substrates were wetted by spraying the solution using a spray gun. The wetted metal substrates were heated in an oven for 2-6 hours at 90-150° C. to yield solid films.

Example 2

Corrosion Test Results

A salt-fog test of the steel substrate performed at 35° C. showed that the lifetime of the steel substrate was dramatically increased to approximately 768 hours, as compared to approximately 10 hours for bare steel. A salt-spray resistance test of the aluminum substrate showed that the salt-spray resistance of the aluminum substrate was dramatically increased to more than 1440 hours, as compared with approximately 40 hours for bare aluminum.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A corrosion-resistant metal surface comprising a metal surface having thereon an ultrathin corrosion-resistant film comprised of a combination of an at least partially crosslinked amido-functionalized silanol component and rare-earth metal oxide nanoparticles, said ultrathin corrosion-resistant film having a thickness of less than ten nanometers on said metal surface.

2. The corrosion-resistant metal surface according to claim 1, wherein said rare-earth metal oxide nanoparticles are comprised of an oxide of one or more metal ions that are lanthanide metals.

3. The corrosion-resistant metal surface according to claim 2, wherein said rare-earth metal oxide nanoparticles are selected from the group consisting of lanthanide metal oxide nanoparticles.

4. The corrosion-resistant metal surface according to claim 3, wherein said rare-earth metal oxide nanoparticles comprise cerium oxide nanoparticles.

5. The corrosion-resistant metal surface according to claim 3, wherein said rare-earth metal oxide nanoparticles comprise samarium oxide nanoparticles.

6. The corrosion-resistant metal surface according to claim 1, wherein said at least partially crosslinked amido-functionalized silanol component is comprised of at least partially crosslinked versions of one or more silanol compounds represented by the formula $$R^1_n R^2_m R^3_r Si(OH)_{4-m-n-r} \quad (1)$$

wherein $R^1$, $R^2$, and $R^3$ each independently represent H; or a saturated or unsaturated, straight-chained or branched, or cyclic, polycyclic, fused, or acyclic hydrocarbon group having 1 to 50 carbon atoms; wherein for at least one of said one or more silanol compounds, at least one of $R^1$, $R^2$, and $R^3$ represent said hydrocarbon groups and at least one of said hydrocarbon groups has one or more hydrogen atoms substituted by one or more primary amino groups, one or more of which are N-acylated with one or more acyl groups; or alternatively, or in addition, one or more secondary carbon atoms substituted by one or more additional heteroatom groups;

optionally, when two or all of $R^1$, $R^2$, and $R^3$ are present and said two or all of $R^1$, $R^2$, and $R^3$ are hydrocarbon groups, two or three of said hydrocarbon groups are connected to form a silicon-containing ring or polycyclic ring system; m, n, and r independently represent 0 or 1, provided that m, n, and r are not all 0; and when m, n, and r are all 1, then at least one of $R^1$, $R^2$, and $R^3$ is additionally substituted with one or more groups selected from $\equiv$Si(OH), $=$Si(OH)$_2$, or —Si(OH)$_3$, wherein the symbols $=$ and $\equiv$ represent two and three separate single bonds, respectively, wherein each single bond is between a silicon atom and a carbon atom or between a silicon atom and a or suitable heteroatom.

7. The corrosion-resistant metal surface according to claim 6, wherein said one or more additional heteroatom linkers or heteroatom groups are one or more silano linkers or silano groups.

8. The corrosion-resistant metal surface according to claim 6, wherein said one or more acyl groups are independently represented by the formula $$R^a\text{—C(O)—} \quad (5)$$

wherein $R^a$ independently represents H; or a saturated or unsaturated, straight-chained or branched, or cyclic, polycyclic, fused, or acyclic hydrocarbon group having 1 to 50 carbon atoms.

9. The corrosion-resistant metal surface according to claim 8, wherein said one or more silanol compounds are silanetriol compounds independently represented by the formula $$R^1 Si(OH)_3 \quad (2)$$

wherein $R^1$ independently represents a saturated or unsaturated, straight-chained or branched, or cyclic, polycyclic, fused, or acyclic hydrocarbon group having 1 to 50 carbon atoms, wherein for at least one of said one or more silanetriol compounds, one or more hydrogen atoms of said hydrocarbon group are substituted by one or more primary amino groups, one or more of which are N-acylated with one or more acyl groups; or alternatively, or in addition, one or more secondary carbon atoms of said hydrocarbon group are substituted by one or more secondary amino groups, one or more of which are N-acylated with one or more acyl groups.

10. The corrosion-resistant metal surface according to claim 9, wherein $R^1$ represents the formula $$R^a\text{—C(O)—NH—(CH}_2)_p\text{—} \quad (6)$$

wherein $R^a$ independently represents a saturated or unsaturated, straight-chained or branched, or cyclic, polycyclic, fused, or acyclic hydrocarbon group having 1 to 50 carbon atoms; and p represents an integer from 1 to 50.

11. The corrosion-resistant metal surface according to claim 10, wherein p is an integer from 1 to 20, and $R^a$ independently represents a saturated or unsaturated, straight-chained or branched, cyclic or acyclic hydrocarbon group having 1 to 10 carbon atoms.

12. The corrosion-resistant metal surface according to claim 11, wherein $R^a$ is a methyl group.

13. The corrosion-resistant metal surface according to claim 11, wherein the at least partially crosslinked amido-functionalized silanol component is comprised of at least partially crosslinked versions of N-acylated derivatives of one or more amino-functionalized silanetriols independently selected from aminomethylsilanetriol, 2-aminoethylsilanetriol, 3-aminopropylsilanetriol, 4-aminobutylsilanetriol, 5-aminopentylsilanetriol, 6-aminohexylsilanetriol, 7-aminoheptylsilanetriol, 8-aminooctylsilanetriol, 9-aminononylsilanetriol, 10-aminodecylsilanetriol, 11-aminoundecylsilanetriol, 12-aminododecylsilanetriol, 16-aminohexadecylsilanetriol, or 18-aminooctadecylsilanetriol.

14. The corrosion-resistant metal surface according to claim 13, wherein said one or more amino-functionalized silanetriols is 3-aminopropylsilanetriol.

15. The corrosion-resistant metal surface according to claim 6, wherein a portion of the silicon atoms in said at least partially crosslinked amido-functionalized silanol component are bound to carboxylate-containing groups.

16. The corrosion-resistant metal surface according to claim 15, wherein said carboxylate-containing groups are independently represented by the formula

$$R^b\text{—C(O)O—} \tag{7}$$

wherein $R^b$ independently represents H; or a saturated or unsaturated, straight-chained or branched, or cyclic, polycyclic, fused, or acyclic hydrocarbon group having 1 to 50 carbon atoms.

17. The corrosion-resistant metal surface according to claim 16, wherein $R^b$ independently represents a saturated or unsaturated, straight-chained or branched, cyclic or acyclic hydrocarbon group having 1 to 12 carbon atoms.

18. The corrosion-resistant metal surface according to claim 17, wherein said carboxylate-containing groups are acetate groups.

19. A corrosion-resistant metal surface comprising a metal surface coated with an ultrathin corrosion-resistant film comprised of a combination of an at least partially crosslinked N-acylated aminoalkylsilanetriol component and cerium oxide nanoparticles, said ultrathin corrosion-resistant film having a thickness of less than ten nanometers on said metal surface.

20. A corrosion-resistant metal surface comprising a metal surface coated with an ultrathin corrosion-resistant film comprised of a combination of an at least partially crosslinked N-acylated aminoalkylsilanetriol component and samarium oxide nanoparticles, said ultrathin corrosion-resistant film having a thickness of less than ten nanometers on said metal surface.

21. The corrosion-resistant metal surface according to claim 7, wherein the metal surface is selected from the group consisting of aluminum, aluminum alloy, steel, iron, iron alloy, copper, copper alloy, lead, nickel, nickel alloy, zinc, zinc alloy, cobalt, cobalt alloy, chromium, and chromium alloy.

22. The corrosion-resistant metal surface according to claim 21, wherein the metal surface is aluminum.

23. The corrosion-resistant metal surface according to claim 21, wherein the metal surface is an aluminum alloy.

24. The corrosion-resistant metal surface according to claim 23, wherein the aluminum alloy is an aluminum-copper alloy.

25. The corrosion-resistant metal surface according to claim 23, wherein the aluminum alloy is an aluminum-magnesium alloy.

26. The corrosion-resistant metal surface according to claim 21, wherein the metal surface is a steel.

27. The corrosion-resistant metal surface according to claim 26, wherein the steel is a low carbon steel.

28. The corrosion-resistant metal surface according to claim 26, wherein the steel is a medium carbon steel.

29. The corrosion-resistant metal surface according to claim 26, wherein the steel is a high carbon steel.

30. The corrosion-resistant metal surface according to claim 26, wherein the steel is a galvanized steel.

31. The corrosion-resistant metal surface according to claim 26, wherein the steel is a zinc phosphated steel.

32. The corrosion-resistant metal surface according to claim 26, wherein the steel is a stainless steel.

33. The corrosion-resistant metal surface according to claim 21, wherein the metal surface is copper.

34. The corrosion-resistant metal surface according to claim 21, wherein the metal surface is a copper alloy.

35. The corrosion-resistant metal surface according to claim 34, wherein the metal surface is a bronze.

36. The corrosion-resistant metal surface according to claim 34, wherein the metal surface is a brass.

37. The corrosion-resistant metal surface according to claim 21, wherein the metal surface is iron.

38. The corrosion-resistant metal surface according to claim 21, wherein the metal surface is an iron-copper alloy.

39. The corrosion-resistant metal surface according to claim 21, wherein the metal surface is nickel.

40. The corrosion-resistant metal surface according to claim 21, wherein the metal surface is a nickel-alloy.

41. The corrosion-resistant metal surface according to claim 21, wherein the metal surface is passivated.

42. The corrosion-resistant metal surface according to claim 41, wherein the metal surface is anodized.

43. A method for producing a corrosion-resistant metal surface, the method comprising the steps of forming on a metal surface an ultrathin corrosion-resistant film having a thickness of less than ten nanometers comprised of a combination of an at least partially crosslinked amido-functionalized silanol component and rare-earth metal oxide nanoparticles, thereby rendering said metal surface corrosion-resistant.

44. The method according to claim 43, wherein said ultrathin corrosion-resistant film is formed by subjecting a metal surface having thereon one or more silanol compounds in combination with one or more rare-earth metal carboxylate compounds, to one or more treatment steps which promote or effect silanol crosslinking of said one or more silanol compounds and degradation of said one or more rare-earth metal carboxylate compounds to rare-earth metal oxide nanoparticles, wherein one or more of said silanol compounds are amino-functionalized.

45. The method according to claim 44, wherein said one or more treatment steps comprises thermally treating said metal surface at a temperature and for a time sufficient to produce said corrosion-resistant metal surface.

46. The method according to claim 44, wherein said combination is applied onto the metal surface as a solution comprised of said one or more silanol compounds and said one or more rare-earth metal carboxylate compounds in a liquid phase.

47. The method according to claim 46, wherein said liquid phase is aqueous-based and said solution is an aqueous-based solution.

48. The method according to claim 46, wherein the metal surface is dipped into said solution.

49. The method according to claim 46, wherein said solution is sprayed onto the metal surface.

50. The method according to claim 44, wherein said one or more rare-earth metal carboxylate compounds is lanthanide metal carboxylates.

51. The method according to claim 50, wherein said one or more rare-earth metal carboxylate compounds are selected from the group of lanthanide metal carboxylates.

52. The method according to claim 51, wherein said one or more lanthanide metal carboxylates are comprised of a carboxylate component independently represented by the formula $$R^b\text{---C(O)O}^- \tag{7}$$

wherein $R^b$ independently represents a saturated or unsaturated, straight-chained or branched, or cyclic, polycyclic, fused, or acyclic hydrocarbon group having 1 to 50 carbon atoms; and one or more metal ions selected from lanthanum, cerium, praesodymium, neodymium, promethium, samarium, europium, gadolinium, terbium, dysprosium, holmium, erbium, thulium, ytterbium, or lutetium.

53. The method according to claim 52, wherein $R^b$ independently represents a saturated or unsaturated, straight-chained or branched, cyclic or acyclic hydrocarbon group having 1 to 12 carbon atoms.

54. The method according to claim 52, wherein said one or more lanthanide metal carboxylates comprises a cerium carboxylate.

55. The method according to claim 54, wherein said cerium carboxylate is cerium acetate.

56. The method according to claim 52, wherein said one or more lanthanide metal carboxylates comprises a samarium carboxylate.

57. The method according to claim 56, wherein said samarium carboxylate is samarium acetate.

58. The method according to claim 50, wherein said one or more rare-earth metal carboxylate compounds are selected from the group of actinide metal carboxylates.

59. The method according to claim 43, wherein said one or more silanol compounds are independently represented by the formula:

$$R^1{}_nR^2{}_mR^3{}_r\text{Si(OH)}_{4-m-n-r} \tag{1}$$

wherein $R^1$, $R^2$, and $R^3$ each independently represent H; or a saturated or unsaturated, straight-chained or branched, or cyclic, polycyclic, fused, or acyclic hydrocarbon group having 1 to 50 carbon atoms; wherein for at least one of said one or more silanol compounds, at least one of $R^1$, $R^2$, and $R^3$ represent said hydrocarbon groups and at least one of said hydrocarbon groups has one or more hydrogen atoms substituted by one or more primary amino groups; or alternatively, or in addition, one or more secondary carbon atoms substituted by one or more secondary amino groups;

optionally, one or more of said hydrocarbon groups either substituted or not substituted by said one or more primary or secondary amino groups have one or more carbon atoms substituted by one or more additional heteroatom linkers or heteroatom groups; or alternatively, or in addition, have one or more hydrogen atoms substituted by one or more additional heteroatom groups;

optionally, when two or all of $R^1$, $R^2$, and $R^3$ are present and said two or all of $R^1$, $R^2$, and $R^3$ are hydrocarbon groups, two or three of said hydrocarbon groups are connected to form a silicon-containing ring or polycyclic ring system;

m, n, and r independently represent 0 or 1, provided that m, n, and r are not all 0; and when m, n, and r are all 1, then at least one of $R^1$, $R^2$, and $R^3$ is additionally substituted with one or more groups selected from $=$Si(OH), $=$Si(OH)$_2$, or —Si(OH)$_3$, wherein the symbols $=$ and $\equiv$ represent two and three separate single bonds, respectively, wherein each single bond is between a silicon atom and a carbon atom or between a silicon atom and a suitable heteroatom.

60. The method according to claim 59, wherein said one or more silanol compounds are one or more silanetriol compounds independently represented by the formula $$R^1\text{Si(OH)}_3 \tag{2}$$

wherein $R^1$ independently represents a saturated or unsaturated, straight-chained or branched, or cyclic, polycyclic, fused, or acyclic hydrocarbon group having 1 to 50 carbon atoms, wherein for at least one of said one or more silanetriol compounds, one or more hydrogen atoms of said hydrocarbon group are substituted by one or more primary amino groups; or alternatively, or in addition, one or more secondary carbon atoms of said hydrocarbon group are substituted by one or more secondary amino groups.

61. The method according to claim 59, wherein said one or more silanol compounds are derived by water-mediated hydrolysis of one or more siloxane compounds independently represented by the formula:

$$R^1{}_nR^2{}_mR^3{}_r\text{Si(OR}^4)_{4-m-n-r} \tag{3}$$

wherein $R^1$, $R^2$, and $R^3$ each independently represent H; or a saturated or unsaturated, straight-chained or branched, or cyclic, polycyclic, fused, or acyclic hydrocarbon group having 1 to 50 carbon atoms; wherein for at least one of said one or more siloxane compounds, at least one of $R^1$, $R^2$, and $R^3$ represent said hydrocarbon groups and at least one of said hydrocarbon groups has one or more hydrogen atoms substituted by one or more primary amino groups; or alternatively, or in addition, one or more secondary carbon atoms substituted by one or more secondary amino groups;

$R^4$ independently represents a saturated or unsaturated, straight-chained or branched, cyclic or acyclic hydrocarbon group having 1 to 6 carbon atoms, or a silano group;

optionally, one or more hydrocarbon groups, either substituted or not substituted by said one or more primary and/or secondary amino groups, have one or more carbon atoms substituted by one or more additional heteroatom linkers or heteroatom groups; or alternatively, or in addition, have one or more hydrogen atoms substituted by one or more additional heteroatom groups;

optionally, when two or all of $R^1$, $R^2$, and $R^3$ are present and said two or all of $R^1$, $R^2$, and $R^3$ are hydrocarbon groups, two or three of said hydrocarbon groups are connected to form a silicon-containing ring or polycyclic ring system;

m, n, and r independently represent 0 or 1, provided that m, n, and r are not all 0; and when m, n, and r are all 1, then at least one of $R^1$, $R^2$, and $R^3$ is additionally substituted with one or more groups selected from $=$Si(OR$^d$), $=$Si(OR$^d$)$_2$, or —Si(OR$^d$)$_3$, wherein $R^d$ independently represents H; or a saturated or unsaturated, straight-chained or branched, cyclic or acyclic hydrocarbon group having 1 to 6 carbon atoms, or a silano group; and the symbols $=$ and $\equiv$ represent two and three separate single bonds, respectively, wherein each single bond is between a silicon atom and a carbon atom or between a silicon atom and a suitable heteroatom.

62. The method according to claim 61, wherein said water-mediated hydrolysis is aided by the inclusion of a catalytic amount of an acid.

63. The method according to claim 61, wherein said one or more siloxane compounds are independently represented by the formula $$R^1\text{Si(OR}^4)_3 \tag{4}$$

wherein $R^1$ represents a saturated or unsaturated, straight-chained or branched, or cyclic, polycyclic, fused, or acyclic hydrocarbon group having 1 to 50 carbon atoms, wherein one or more hydrogen atoms of said hydrocarbon group are substituted by one or more primary amino groups or alternatively, or in addition, one or more secondary carbon atoms of said hydrocarbon group are substituted by one or more secondary amino groups, and R$^4$ independently represents a saturated or unsaturated; straight-chained or branched; cyclic or acyclic hydrocarbon group having 1 to 6 carbon atoms, or a silano group.

64. The method according to claim 63, wherein said water-mediated hydrolysis is aided by the inclusion of a catalytic amount of an acid.

65. The method according to claim 60, wherein R$^1$ represents the formula $$H_2N\!-\!(CH_2)_p\!- \tag{8}$$

wherein p represents an integer from 1 to 50.

66. The method according to claim 65, wherein p is an integer from 1 to 20.

67. The method according to claim 66, wherein one or more silanol compounds are independently selected from aminomethylsilanetriol, 2-aminoethylsilanetriol, 3-aminopropylsilanetriol, 4-aminobutylsilanetriol, 5-aminopentylsilanetriol, 6-aminohexylsilanetriol, 7-aminoheptylsilanetriol, 8-aminooctylsilanetriol, 9-aminononylsilanetriol, 10-aminodecylsilanetriol, 11-aminoundecylsilanetriol, 12-aminododecylsilanetriol, 16-aminohexadecylsilanetriol, or 18-aminooctadecylsilanetriol.

68. The method according to claim 67, wherein said one or more silanol compounds is 3-aminopropylsilanetriol.

69. The method according to claim 45, wherein the metal surface is heated to within a temperature range of approximately 40° C. to 250° C.

70. The method according to claim 69, wherein the metal surface is heated to within a temperature range of approximately 90° C. to 150° C.

71. The method according to claim 69, wherein the metal surface is heated for approximately 0.5 to 48 hours.

72. The method according to claim 70, wherein the metal surface is heated for approximately 1 to 24 hours.

73. The method according to claim 72, wherein the metal surface is heated for approximately 2 to 6 hours.

74. A method for producing a corrosion-resistant metal surface, the method comprising treating a metal surface wetted with an aqueous solution comprised of a combination of one or more silanetriol compounds and one or more cerium carboxylate compounds at a temperature and for a time sufficient to produce said corrosion-resistant metal surface comprising cerium oxide nanoparticles, wherein one or more of said silanetriol compounds are amino-functionalized.

75. The method according to claim 74, wherein said one or more silanetriol compounds is 3-aminopropylsilanetriol and said cerium carboxylate compound is cerium acetate.

76. A method for producing a corrosion-resistant metal surface, the method comprising the steps of treating a metal surface wetted with an aqueous solution comprised of a combination of one or more silanetriol compounds and one or more samarium carboxylate compounds at a temperature and for a time sufficient to produce said corrosion-resistant metal surface, wherein one or more of said silanol compounds are amino- functionalized, and wherein said corrosion-resistant metal surface has a film that is less than ten nanometers thick.

77. The method according to claim 76, wherein said one or more silanetriol compounds is 3-aminopropylsilanetriol and said samarium carboxylate is samarium acetate.

78. An ultrathin corrosion-resistant film comprised of a combination of an at least partially crosslinked amido-functionalized silanol component and rare-earth metal oxide nanoparticles, said ultrathin corrosion-resistant film having a thickness of less than ten nanometers.

79. The corrosion-resistant metal surface according to claim 1, wherein said rare-earth metal oxide nanoparticles are comprised of an oxide of one or more metal ions that are actinide metals.

80. The corrosion-resistant metal surface according to claim 1, wherein said rare-earth metal oxide nanoparticles are comprised of an oxide of one or more metal ions that are a combination of lanthanide metals and actinide metals.

81. The method according to claim 44, wherein said one or more rare-earth metal carboxylate compounds is actinide metal carboxylates.

82. The method according to claim 44, wherein said rare-earth metal carboxylate compounds is a combination of lanthanide metal carboxylates and actinide metal carboxylates.

* * * * *